United States Patent
Ueda et al.

(10) Patent No.: US 11,894,553 B2
(45) Date of Patent: Feb. 6, 2024

(54) ELECTRODE, SECONDARY BATTERY, BATTERY PACK AND VEHICLE

(71) Applicant: KABUSHIKI KAISHA TOSHIBA, Tokyo (JP)

(72) Inventors: Kakuya Ueda, Yokohama (JP); Yasunobu Yamashita, Tokyo (JP); Keigo Hoshina, Yokohama (JP); Tetsuya Sasakawa, Yokohama (JP); Yasuhiro Harada, Isehara (JP); Norio Takami, Yokohama (JP); Shinsuke Matsuno, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 51 days.

(21) Appl. No.: 17/186,819

(22) Filed: Feb. 26, 2021

(65) Prior Publication Data
US 2022/0085365 A1 Mar. 17, 2022

(30) Foreign Application Priority Data
Sep. 14, 2020 (JP) ................... 2020-153895

(51) Int. Cl.
*H01M 4/485* (2010.01)
*H01M 4/133* (2010.01)
(Continued)

(52) U.S. Cl.
CPC ............ *H01M 4/485* (2013.01); *H01M 4/131* (2013.01); *H01M 4/133* (2013.01);
(Continued)

(58) Field of Classification Search
CPC ......................... H01M 2004/027; H01M 4/485
See application file for complete search history.

(56) References Cited

U.S. PATENT DOCUMENTS

| 10,170,761 B2 | 1/2019 | Ise et al. |
| 10,490,813 B2 | 11/2019 | Harada et al. |

(Continued)

FOREIGN PATENT DOCUMENTS

| JP | 2010-287496 A | 12/2010 |
| JP | 2012-099287 A | 5/2012 |

(Continued)

OTHER PUBLICATIONS

Takami, Norio, et al. "High-energy, fast-charging, long-life lithium-ion batteries using TiNb2O7 anodes for automotive applications." Journal of Power Sources 396 (2018): 429-436. (Year: 2018).*

(Continued)

*Primary Examiner* — Sadie White
*Assistant Examiner* — Kayla Elaine Clary
(74) *Attorney, Agent, or Firm* — Oblon, McClelland, Maier & Neustadt, L.L.P.

(57) ABSTRACT

According to one embodiment, an electrode is provided. The electrode includes a current collector, and an active material-containing layer which is formed on a surface of the current collector and includes a plurality of niobium titanium composite oxide particles. A X-ray diffraction pattern using a Cu-Kα ray source with respect to a surface of the active material-containing layer includes a peak A with a highest intensity in a range of $2\theta=26°\pm0.2°$ and a peak B with a highest intensity in a range of $2\theta=23.9°\pm0.2°$. An intensity ratio (Ia/Ib) between an intensity Ia of the peak A and an intensity Ib of the peak B is in a range of 1.80 or more to 2.60 or less.

20 Claims, 11 Drawing Sheets

(51) Int. Cl.
    *H01M 4/131*     (2010.01)
    *H01M 4/02*     (2006.01)
    *H01M 10/42*     (2006.01)

(52) U.S. Cl.
    CPC .... *H01M 10/425* (2013.01); *H01M 2004/021* (2013.01); *H01M 2004/027* (2013.01); *H01M 2004/028* (2013.01); *H01M 2220/20* (2013.01)

(56) References Cited

U.S. PATENT DOCUMENTS

| | | | |
|---|---|---|---|
| 2017/0271682 A1* | 9/2017 | Matsuno | H01M 4/485 |
| 2019/0296346 A1 | 9/2019 | Harada et al. | |

FOREIGN PATENT DOCUMENTS

| | | |
|---|---|---|
| JP | 2016-177972 A | 10/2016 |
| JP | 2019-169399 A | 10/2019 |

OTHER PUBLICATIONS

Han, Jian-Tao, Yun-Hui Huang, and John B. Goodenough. "New anode framework for rechargeable lithium batteries." Chemistry of Materials 23.8 (2011): 2027-2029. (Year: 2011).*

Abramoff et al., "Image processing with ImageJ", Biophotonics International, Laurin Publishing Co. Inc., Jul. 2004, 7 pages.

Yen et al., "A New Criterion for Automatic Multilevel Thresholding", IEEE Transactions on Image Processing, vol. 4, No. 3, Mar. 1995, pp. 370-378.

\* cited by examiner

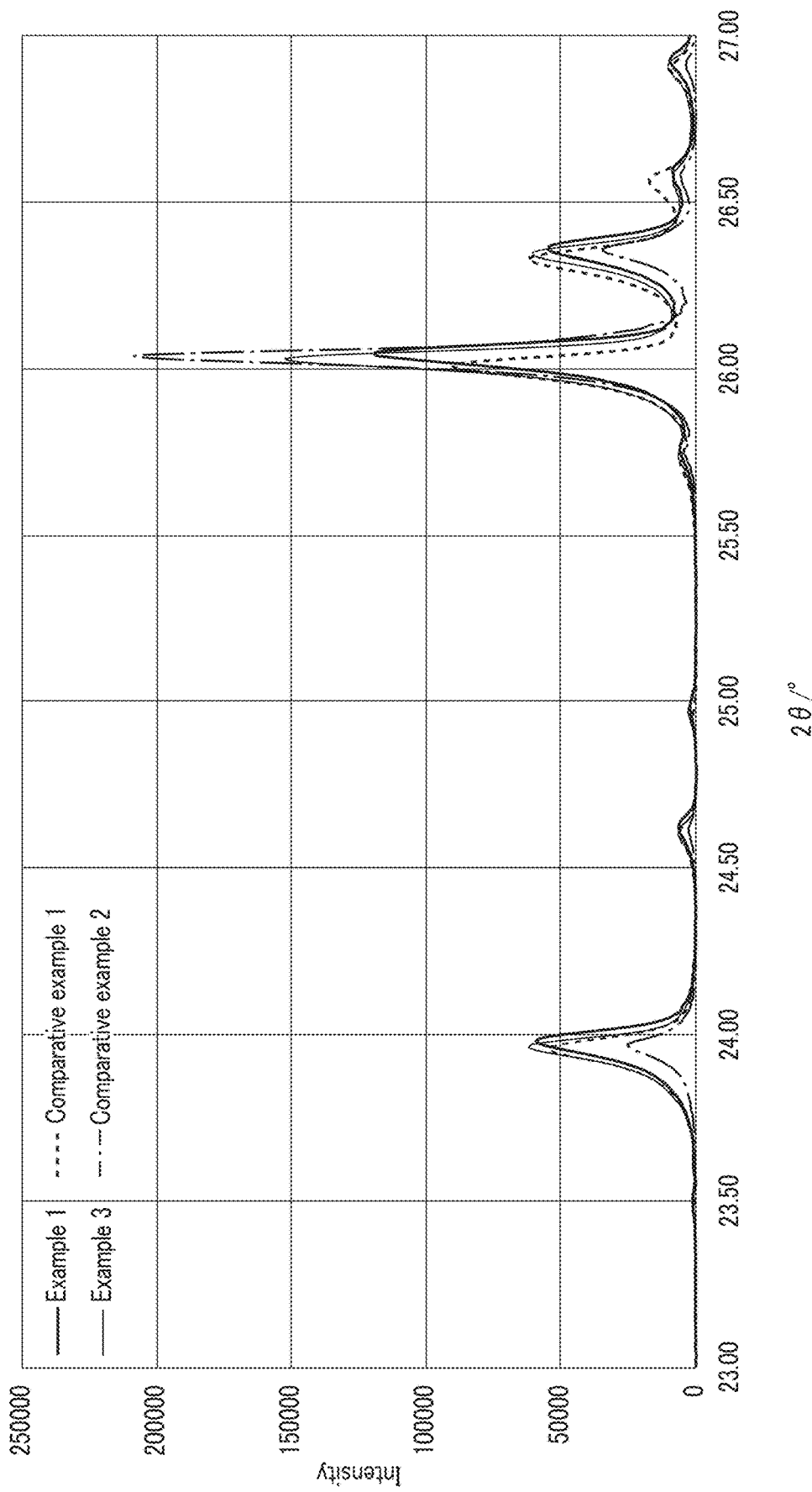
F I G. 18

ELECTRODE, SECONDARY BATTERY, BATTERY PACK AND VEHICLE

CROSS-REFERENCE TO RELATED APPLICATIONS

This application is based upon and claims the benefit of priority from Japanese Patent Application No. 2020-153895, filed Sep. 14, 2020, the entire contents of which are incorporated herein by reference.

FIELD

Embodiments described herein relate generally to an electrode, a secondary battery, a battery pack, and a vehicle.

BACKGROUND

Recently, secondary batteries, such as a nonaqueous electrolyte secondary battery like a lithium ion secondary battery, have been actively researched and developed as a high energy-density battery. The secondary batteries, such as a nonaqueous electrolyte secondary battery, are anticipated as a power source for vehicles such as hybrid electric automobiles, electric cars, an uninterruptible power supply for base stations for portable telephones, or the like. Therefore, the secondary battery is demanded to, in addition to having a high energy density, be excellent in other performances such as rapid charge-discharge performances and long-term reliability, as well. For example, not only is the charging time remarkably shortened in a secondary battery capable of rapid charge and discharge, but the battery is also capable of improving motive performances in vehicles such as hybrid electric automobiles, and efficient recovery of regenerative energy of motive force.

In order to enable rapid charge/discharge, electrons and lithium ions must be able to migrate rapidly between the positive electrode and the negative electrode. However, when a battery using a carbon-based negative electrode is repeatedly subjected to rapid charge and discharge, precipitation of dendrite of metallic lithium on the electrode may sometimes occur, raising concern of heat generation or ignition due to internal short circuits.

In light of this, a battery using a metal composite oxide in a negative electrode in place of a carbonaceous material has been developed. In particular, in a battery using an oxide of titanium in the negative electrode, rapid charge and discharge can be stably performed. Such a battery also has a longer life than in the case of using a carbon-based negative electrode.

However, compared to carbonaceous materials, oxides of titanium have a higher potential relative to metallic lithium. That is, oxides of titanium are more noble. Furthermore, oxides of titanium have a lower capacity per weight. Therefore, a battery using an oxide of titanium for the negative electrode has a problem that the energy density is low.

For example, the electrode potential an oxide of titanium is about 1.5 V (vs. Li/Li$^+$) relative to metallic lithium, which is higher (i.e., more noble) in comparison to potentials of carbon based negative electrodes. The potential of an oxide of titanium is attributed to the redox reaction between Ti$^{3+}$ and Ti$^{4+}$ upon electrochemical insertion and extraction of lithium, and is therefore electrochemically restricted. It is also a fact that rapid charge/discharge of lithium ions can be performed stably at a high electrode potential of about 1.5 V (vs. Li/Li$^+$).

On the other hand, considering the capacity per unit weight, the theoretical capacity of titanium dioxide (anatase structure) is about 165 mAh/g, and the theoretical capacity of spinel type lithium-titanium composite oxides such as Li$_4$Ti$_5$O$_{12}$ is about 180 mAh/g. On the other hand, the theoretical capacity of a general graphite based electrode material is 385 mAh/g and greater. As such, the capacity density of an oxide of titanium is significantly lower than that of the carbon based negative electrode material. This is due to there being only a small number of lithium-insertion sites in the crystal structure, and lithium tending to be stabilized in the structure, and thus, substantial capacity being reduced.

In consideration of the above circumstances, a new electrode material containing Ti and Nb has been studied. Such a niobium-titanium composite oxide material is expected to have a high charge/discharge capacity. Particularly, a composite oxide represented by TiNb$_2$O$_7$ has a high theoretical capacity exceeding 380 mAh/g.

In consideration of the above, a novel electrode material including Ti and Nb has been studied. It is expected that such a niobium titanium composite oxide material has a high charge-and-discharge capacity. In particular, a composite oxide expressed by TiNb$_2$O$_7$ has a high theoretical capacity exceeding 380 mAh/g. Therefore, the niobium titanium composite oxide is expected as a substitute high-capacity material for Li$_4$Ti$_5$O$_{12}$, but there is room for an improvement with respect to the diffusivity of lithium ions in the electrode.

BRIEF DESCRIPTION OF THE DRAWINGS

FIG. 18 is a diffraction diagram showing results of X-ray diffraction pattern of active material-containing layers according to Examples and Comparative Examples.

DETAILED DESCRIPTION

Figure 1:
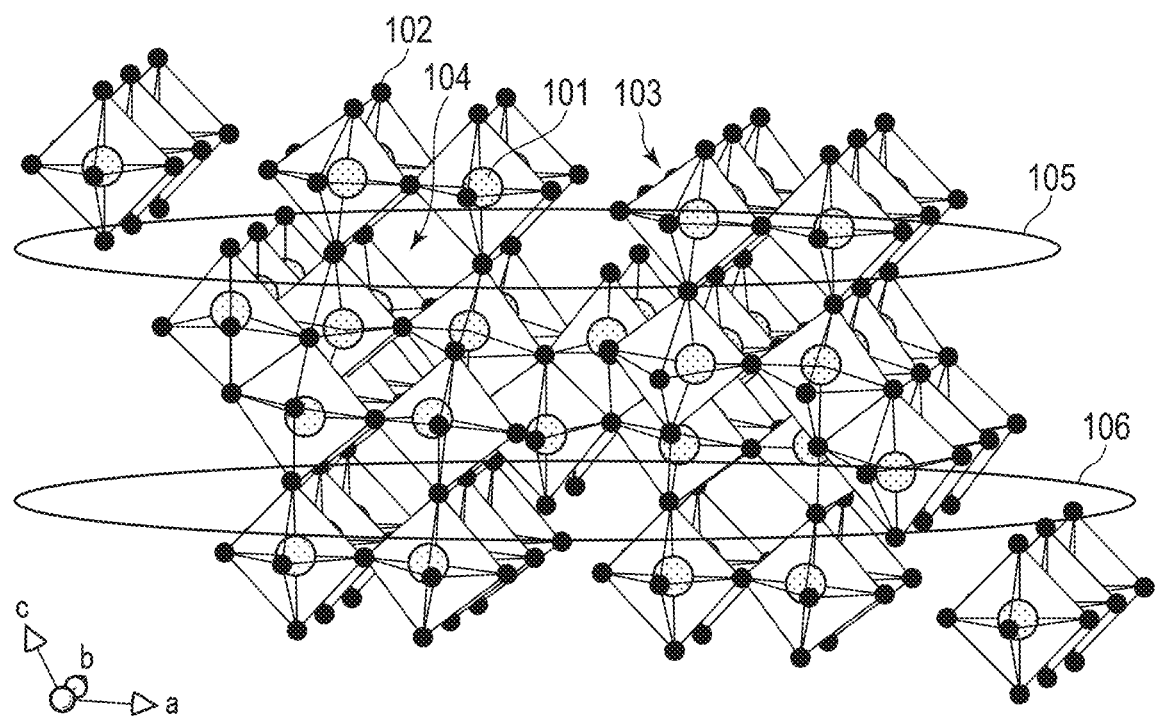
FIG. 1 is a schematic view illustrating a crystal structure of a niobium titanium composite oxide Nb$_2$TiO$_7$.

According to one embodiment, an electrode is provided. The electrode includes a current collector, and an active material-containing layer which is formed on a surface of the current collector and includes a plurality of niobium titanium composite oxide particles. A X-ray diffraction pattern using a Cu-Kα ray source with respect to a surface of the active material-containing layer includes a peak A with a highest intensity in a range of $2\theta=26°\pm0.2°$ and a peak B with a highest intensity in a range of $2\theta=23.9°\pm0.2°$. An intensity ratio (Ia/Ib) between an intensity Ia of the peak A and an intensity Ib of the peak B is in a range of 1.80 or more to 2.60 or less.

According to another embodiment, a secondary battery is provided. The secondary battery includes a positive electrode, a negative electrode according to the embodiment, and an electrolyte.

According to another embodiment, a battery pack is provided. The battery pack includes the secondary battery according to the embodiment.

According to another embodiment, a vehicle is provided. The vehicle includes the battery pack according to the embodiment.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to a first embodiment, an electrode is provided. The electrode includes a current collector, and an active material-containing layer which is formed on a surface of the current collector and includes a plurality of niobium titanium composite oxide particles. A X-ray diffraction pattern using a Cu-Kα ray source with respect to a surface of the active material-containing layer includes a peak A with a highest intensity in a range of $2\theta=26°\pm0.2°$ and a peak B with a highest intensity in a range of $2\theta=23.9°\pm0.2°$. An intensity ratio (Ia/Ib) between an intensity Ia of the peak A and an intensity Ib of the peak B is in a range of 1.80 or more to 2.60 or less.

In an electrode including a niobium titanium composite oxide, an insertion/extraction reaction of Li progresses at a potential of 1.2 V to 1.5 V (vs. Li/Li$^+$). This potential has a great difference from 0 V (vs. Li/Li$^+$) that is a precipitation potential of Li metal. Therefore, even if a large current is passed through the electrode and an overvoltage is applied, and the potential of this negative electrode becomes lower than the above-described insertion/extraction potential, the potential of this electrode is nobler than the precipitation potential of Li metal. For this reason, in the electrode including the niobium titanium composite oxide, the precipitation of Li metal does not easily occur, and thus quick charge and discharge can be performed. Moreover, since the niobium titanium composite oxide includes many sites in which Li can be inserted in the above-described potential range, the niobium titanium composite oxide is excellent from the standpoint of energy density.

However, the diffusion rate of Li in a solid of the niobium titanium composite oxide is not high. Thus, in order to achieve excellent input/output characteristics, it is necessary to improve the Li diffusion rate in the electrode including the niobium titanium composite oxide. For example, in order to increase conductive paths between electrode materials including niobium titanium composite oxide particles, it is conceivable to increase the electrode density by increasing the press pressure at a time of fabricating the electrode. Here, since most of the niobium titanium composite oxide particles have flat shapes, if the press pressure is increased, there is a tendency that the orientation of particles having flat shapes becomes excessively high.

That the orientation is high means that, among particles, the ratio of particles each having a longitudinal direction oriented along an in-plane direction of the current collector or active material-containing layer is high. In order to achieve excellent input/output characteristics, it is necessary to improve the diffusion rate of Li in the thickness direction of the electrode. However, if the orientation of niobium titanium composite oxide particles increases, the Li diffusivity tends to increase not in the thickness direction of the electrode, but in the in-plane direction of the electrode, and the Li diffusivity in the thickness direction does not easily improve. The reason for this will be described below.

The niobium titanium composite oxide is a composite oxide including niobium elements and titanium elements and having a crystal structure called "Wadthley-Roth phase". In this composite oxide, octahedrons, which are formed by metal ions composed of Nb elements and Ti elements, and oxygen ions, constitute blocks by sharing apices. In addition, in the crystal structure of the niobium titanium composite oxide, edge-sharing structures, or tetrahedral structures formed by metal ions composed of Nb elements and Ti elements, and oxygen ions, are coupled while being interposed between the above-described blocks, and are stacked in one axial direction.

It is preferable that the niobium titanium composite oxide is a composite oxide including an $Nb_2TiO_7$ phase in which Nb/Ti=2. In the $Nb_2TiO_7$ phase, the crystal structure belongs to a space group C2/m of a monoclinic system. In this crystal structure, octahedrons formed by metal ions composed of Nb elements and Ti elements, and oxygen ions, are connected in the form of three in vertical by three in horizontal to constitute a block by sharing apices of the octahedrons. In addition, in this crystal structure, layers in which blocks are coupled by edge-sharing overlap in a b-axis direction (to be described later). Since the composite oxide $Nb_2TiO_7$ has a structure with a widest gap among niobium titanium composite oxides, the composite oxide $Nb_2TiO_7$ has a feature that the capacity with which lithium ions can be inserted is highest.

Figure 2:
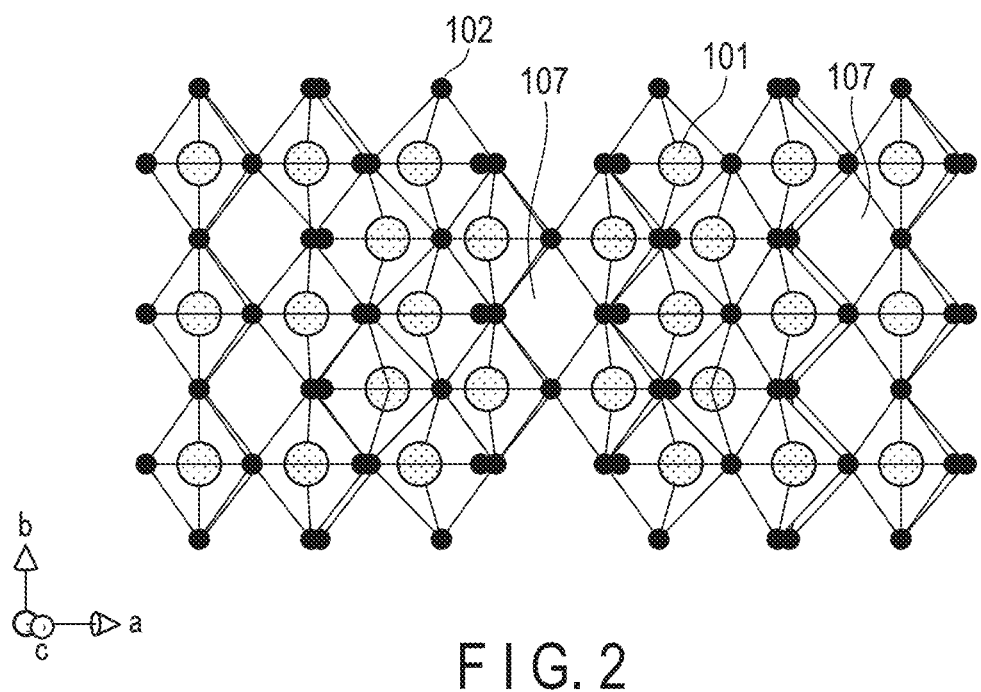
FIG. 2 is a schematic view illustrating the crystal structure of FIG. 1, as viewed from another direction.

Referring to FIG. 1 and FIG. 2, a description will be given of a crystal structure of $Nb_2TiO_7$ that is a monoclinic niobium titanium composite oxide, as an example of the niobium titanium composite oxide. FIG. 1 is a schematic view illustrating a crystal structure of the niobium titanium composite oxide $Nb_2TiO_7$. FIG. 2 is a schematic view illustrating the crystal structure of FIG. 1, as viewed from another direction. In the description below, an a-axis direction and a b-axis direction are mutually orthogonal directions. A c-axis direction is a direction orthogonal to the a-axis direction and the b-axis direction.

As illustrated in FIG. 1, in the crystal structure of monoclinic $Nb_2TiO_7$, a metal ion 101 and an oxide ion 102 form a skeleton structure section 103. At a position of the metal ion 101, Nb ions and Ti ions are arbitrarily arranged at a ratio of Nb:Ti=2:1. Such skeleton structures 103 are alternately arranged three-dimensionally, thereby vacancies 104 are formed among the skeleton structures 103. These vacancies 104 serve as hosts for lithium ions. As illustrated in FIG. 1, the vacancies 104 can occupy a large part in the entire crystal structure. In addition, the vacancies 104 can stably keep the structure even when lithium ions is inserted. Lithium ions can be inserted in this crystal structure from 0 moles up to a maximum of 5.0 moles. Therefore, the composition when 0 to 5.0 moles of lithium ions are inserted can be expressed as $Li_xNb_2TiO_7$ ($0 \leq x \leq 5$).

When a lithium ion is inserted into the vacancy 104 in the above crystal structure, the metal ion 101, which forms the skeleton, is reduced to a trivalent, thereby maintaining electric neutrality of a crystal. In the niobium-titanium composite oxide, not only a Ti ion is reduced from tetravalent to trivalent, but also an Nb ion is reduced from pentavalent to trivalent. Thus, the number of reduced valences per active material of the niobium titanium composite oxide is greater than that of a compound which includes only Ti ions that are tetravalent cations. Therefore, even if many lithium ions are inserted, the electrical neutrality of the crystal can be kept. Thus, the niobium titanium composite oxide has a higher energy density than a compound such as titanium oxide including only tetravalent cations.

In addition, in FIG. 1, regions 105 and 106 are parts having two dimensional channels in the [100] and [010] directions. Further, as illustrated in FIG. 2, the crystal structure of monoclinic $Nb_2TiO_7$ has vacancies 107 in the c direction. The vacancies 107 function as conductive channels in the [001] direction, which connect the region 105 and region 106. By the presence of the conductive channels, lithium ions can move between the region 105 and region 106.

In this manner, in the crystal structure of the monoclinic $Nb_2TiO_7$, an equivalent insertion space of lithium ions is large, and the crystal structure is structurally stable. In addition, the monoclinic $Nb_2TiO_7$ can increase the energy density, compared to the compound which does not include pentavalent cations. Furthermore, in the crystal structure of the monoclinic $Nb_2TiO_7$, since the regions 105 and 106 having two-dimensional channels in which diffusion of lithium ions is fast, and the lithium channel 107 along the [001] direction, which connects these regions, are present, the monoclinic $Nb_2TiO_7$ can improve the insertion property of lithium ions into the insertion space and the extraction property of lithium ions from the insertion space, and can effectively increase the space which contributes to insertion and extraction of lithium ions. As a result of these, the monoclinic $Nb_2TiO_7$ can provide a high capacity. Concretely, the theoretical capacity of the monoclinic $Nb_2TiO_7$ is about 387 mAh/g, and this is double or more the value of a titanium oxide having a spinel structure.

In addition, even if niobium titanium composite oxides have different compositions, the niobium titanium composite oxides can have structures similar to the crystal structure illustrated in FIG. 1 and FIG. 2. Thus, the niobium titanium composite oxide can provide a high capacity.

In addition, the niobium titanium composite oxide has a lithium insertion potential of about 1.5 V (vs. Li/Li$^+$). Therefore, by using such a composite oxide as an active material, a battery, which can perform stable, repetitive quick charge-and-discharge, can be provided.

From the above, the electrode including the niobium titanium composite oxide can have an excellent quick charge-and-discharge performance and a high energy density.

However, since each of the Ti$^{4+}$ ion and Nb$^{5+}$ ion included in the niobium titanium composite oxide has neither a 3d electron nor a 4d electron, the electrical conductivity thereof is low. Thus, when the electrode including the niobium titanium composite oxide is fabricated, a conductive agent, which is excellent in conductivity, is mixed with a niobium titanium composite oxide as electrode materials, thereby securing electrical conductivity in the electrode (active material-containing layer). In addition, as described above, when the electrode is fabricated, the active material-containing layer including the electrode materials is subjected to pressing such as rolling, thereby enhancing adhesivity between the electrode materials and improving the electrical conductivity and the energy density.

However, the crystal structure of the monoclinic niobium titanium composite oxide is not isotropic, and the surface energy of each crystal surface is different, and thus there is a tendency that anisotropy occurs in particle shape. Specifically, in FIG. 1 and FIG. 2, primary particle tend to easily grow in the a-axis direction corresponding to the [100] direction and in the b-axis direction corresponding to the [010] direction. Accordingly, as the generated particle, a flat-shaped primary particle, the longitudinal direction (major axis) of which is the a-axis direction and/or b-axis direction, and the transverse direction (minor axis) of which is the c-axis direction corresponding to the [001] direction, tend to be easily generated.

If the active material-containing layer including a large amount of flat-shaped primary particles is pressed, the longitudinal direction of these particles tends to be oriented along an in-plane direction of the electrode. In other words, the state of the flat-shaped primary particles is such that the primary particles are stacked in the c-axis direction (the thickness direction of the electrode). In addition, lithium ions tend to more easily diffuse in the a-axis direction and b-axis direction than in the c-axis direction. Specifically, in the monoclinic niobium titanium composite oxide, the Li diffusion coefficient in the [100] direction and [010] direction is higher than the Li diffusion coefficient in the [001] direction. Therefore, in the electrode with high orientation of niobium titanium composite oxide particles, there is a case in which the diffusion of lithium ions in the in-plane direction of the electrode progresses advantageously, and the diffusion of lithium ions in the thickness direction of the electrode progresses relatively less easily.

In consideration of the above-described circumstance, in the electrode according to the embodiment, an excessive increase of orientation of niobium titanium composite oxide particles in the active material-containing layer is suppressed, and thus lithium ions tend to easily diffuse in the thickness direction of the electrode. As a result, the electrode according to the embodiment can achieve excellent input/output characteristics.

Specifically, an X-ray diffraction pattern using a Cu-Kα ray source with respect to a surface of the active material-containing layer includes a peak A with a highest intensity in a range of 2θ=26°±0.2° and a peak B with a highest intensity in a range of 2θ=23.9°±0.2°. An intensity ratio (Ia/Ib) between an intensity Ia of the peak A and an intensity Ib of the peak B is in a range of 1.80 or more to 2.60 or less. If the peak intensity ratio (Ia/Ib) is in the range of 1.80 or more to 2.60 or less, the niobium titanium composite oxide particles included in the active material-containing layer are properly oriented, and thus excellent input/output characteristics can be achieved. Note that a method of performing X-ray diffraction with respect to the surface of the active material-containing layer will be described later.

In the X-ray diffraction pattern, the peak A is a peak with a highest intensity peak occurring in the range of 2θ=26°±0.2°. The peak A is a peak of the 003 plane of the niobium titanium composite oxide.

In the X-ray diffraction pattern, the peak B is a peak with a highest intensity occurring in the range of 2θ=23.9°±0.2°. The peak B is a peak of the 110 plane of the niobium titanium composite oxide.

It can be judged that as the peak intensity ratio (Ia/Ib) becomes greater, there is a tendency that the 003 plane of the niobium titanium composite oxide particles is oriented along the thickness direction of the electrode. When the peak intensity ratio (Ia/Ib) exceeds 2.60, the ratio of the orientation of the 003 plane along the electrode thickness direction is high. The direction of the 003 plane of the niobium titanium composite oxide corresponds to the above-described [001] direction. Therefore, when the peak intensity ratio (Ia/Ib) exceeds 2.60, the diffusion in the thickness direction of the electrode becomes disadvantageous, and the Li concentration gradient in this direction increases. As a result, a decrease occurs in input/output characteristics of the electrode and, by extension, a decrease occurs in cycle characteristics. On the other hand, when the peak intensity ratio (Ia/Ib) is less than 1.80, the orientation of the niobium titanium composite oxide is nonuniform, and the Li ion conduction between crystallites becomes disadvantageous. As a result, the input/output characteristics of the electrode deteriorate.

The peak intensity ratio (Ia/Ib) is, preferably, in a range of 1.8 to 2.2.

Figure 5:
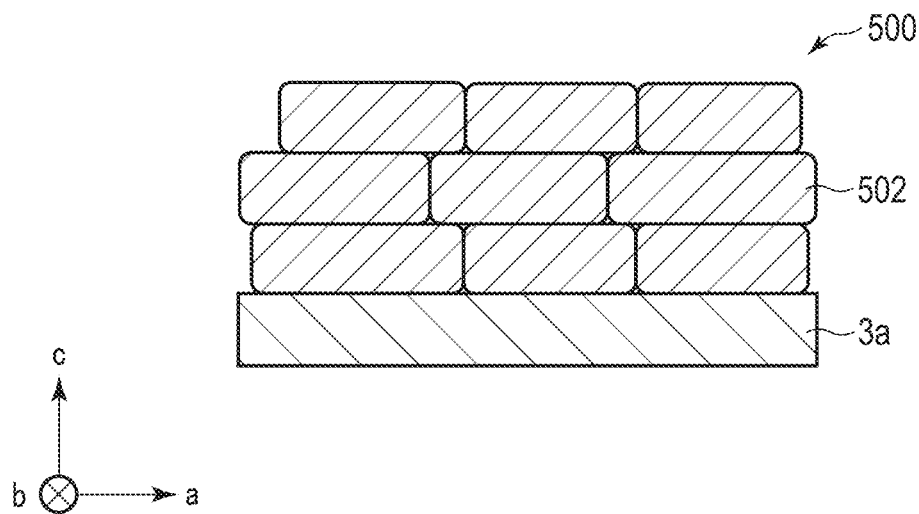
FIG. 5 is a cross-sectional schematic view illustrating an example of an active material-containing layer which an electrode according to a reference example includes.

Here, FIG. 5 relating to a reference example is a schematic view illustrating an example of an orientation state of niobium titanium composite oxide particles in an active material-containing layer, in a case in which the peak intensity ratio (Ia/Ib) is excessively high. In FIG. 5, for the purpose of convenience, the depiction of a conductive agent and a binder included in the active material-containing layer is omitted. The case in which the peak intensity ratio (Ia/Ib) is excessively high is a case in which the peak intensity ratio exceeds 2.60.

As illustrated in FIG. 5, an active material-containing layer 500 according to the reference example is formed on a current collector 3a, and includes a plurality of flat-shaped active material particles 502. The active material particles 502 are oriented along the a-axis direction and/or b-axis direction and are stacked in the c-axis direction. As described above, since the Li diffusion coefficient in the c-axis direction is low, the input/output characteristics of the active material-containing layer relating to FIG. 5 tend to deteriorate.

Figure 4:
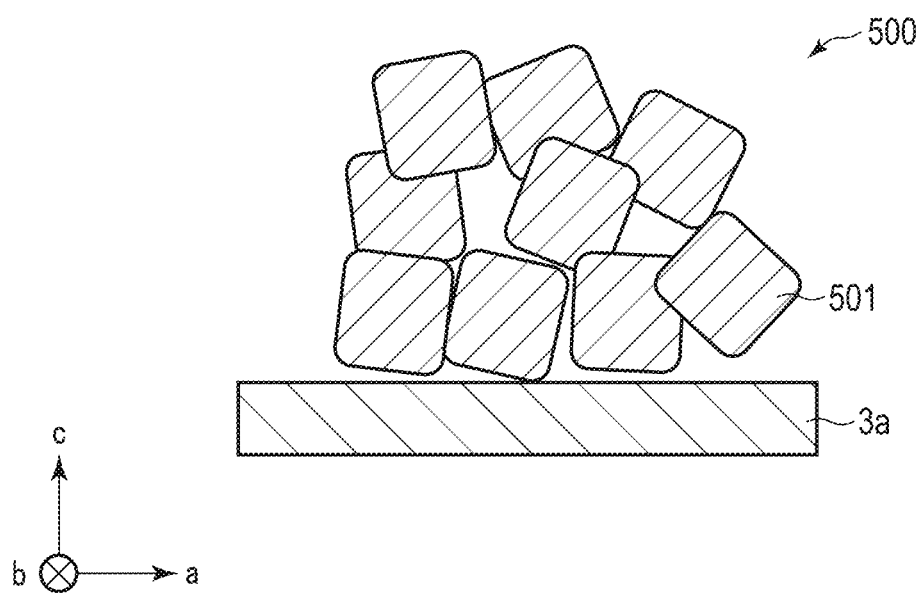
FIG. 4 is a cross-sectional schematic view illustrating an example of an active material-containing layer which an electrode according to a reference example includes.

FIG. 4 relating to a reference example is a schematic view illustrating an example of an orientation state of niobium titanium composite oxide particles in an active material-containing layer, in a case in which the peak intensity ratio (Ia/Ib) is excessively low. In FIG. 4, for the purpose of convenience, the depiction of a conductive agent and a binder included in the active material-containing layer is omitted. The case in which the peak intensity ratio (Ia/Ib) is excessively low is a case in which the peak intensity ratio is less than 1.80.

As illustrated in FIG. 4, an active material-containing layer 500 according to the reference example is formed on a current collector 3a, and includes a plurality of substantially spherical active material particles 501. Each of the active material particles 501 may be a particle which is formed by being grown substantially isotropically. Therefore, even if the active material-containing layer 500 including the active material particles 501 is pressed, these particles are not easily oriented.

When the direction of orientation is uniform to some extent among niobium titanium composite oxide particles, the conductivity of Li ions between these particles is higher than in the case where the orientation of particles is lower. The reason for this is that when Li ions move between the niobium titanium composite oxide particles, the crystal orientation of a certain particle substantially agrees with the crystal orientation of another particle, and thus Li ions can easily diffuse between these particles. In the case of the reference example illustrated in FIG. 4, since the crystal orientations do not agree between mutually neighboring particles, the diffusion of Li ions is hindered, and this is not preferable.

Figure 3:
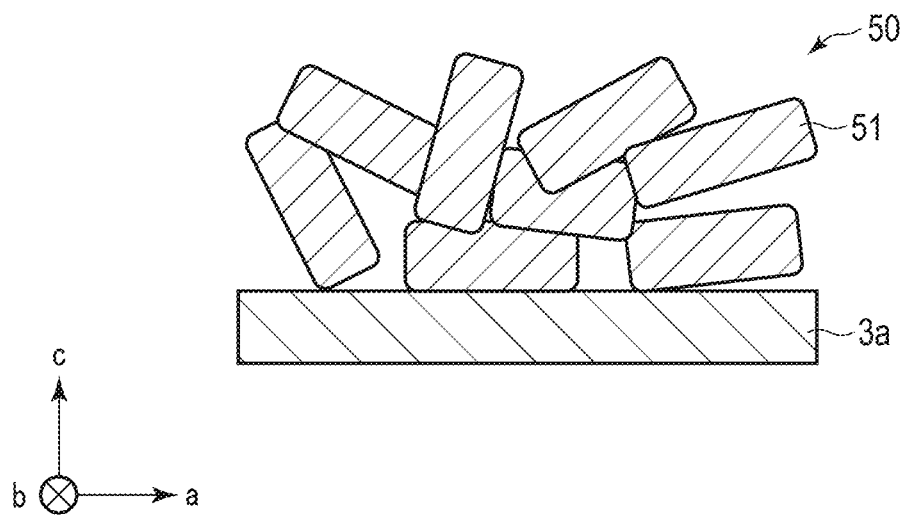
FIG. 3 is a cross-sectional schematic view illustrating an example of an active material-containing layer which an electrode according to an embodiment includes.

FIG. 3 schematically illustrates an example of an active material-containing layer included in the electrode according to the embodiment. The electrode includes a current collector 3a, and an active material-containing layer 50 which is formed on the current collector 3a and includes a plurality of niobium titanium composite oxide particles 51. In FIG. 3, for the purpose of convenience, the depiction of a conductive agent and a binder, which may be included in the active material-containing layer, is omitted. A cross section illustrated in FIG. 3 is a cross section obtained when the electrode is cut along the thickness direction. The thickness direction of the electrode is a direction of stacking of the current collector 3a and the active material-containing layer 50.

Unlike the case of FIG. 4 and the case of FIG. 5, the niobium titanium composite oxide particles 51 shown in FIG. 3 have an orientation to some degree. The orientation to some degree means such an orientation that the peak intensity ratio (Ia/Ib) is in a range of 1.80 or more to 2.60 or less in the diffraction diagram of X-ray diffraction with respect to the surface of the active material-containing layer.

Since FIG. 3 is a schematic diagram, FIG. 3 illustrates only flat-shaped niobium titanium composite oxide particles. However, the active material-containing layer according to the embodiment may include niobium titanium composite oxide particles having other shapes, such as a spherical shape, as far as the peak intensity ratio (Ia/Ib) is in the range of 1.80 or more to 2.60 or less.

On the other hand, as described above, the niobium titanium composite oxide has such a property that flat-shaped primary particles are easily generated. Therefore, the length of the diffusion distance of Li ions can be evaluated, not by paying attention to the result of X-ray diffraction of the surface of the active material-containing layer, but by observing in which direction the flat-shaped primary particles are directed in the active material-containing layer. Thereby, the superiority or inferiority of input/output characteristics of the electrode can be estimated.

In which direction the niobium titanium composite oxide particles are directed in the active material-containing layer can be evaluated based on an SEM image obtained by SEM (Scanning Electron Microscopy) observation of the cross section along the thickness direction of the electrode (active material-containing layer).

Figure 6:
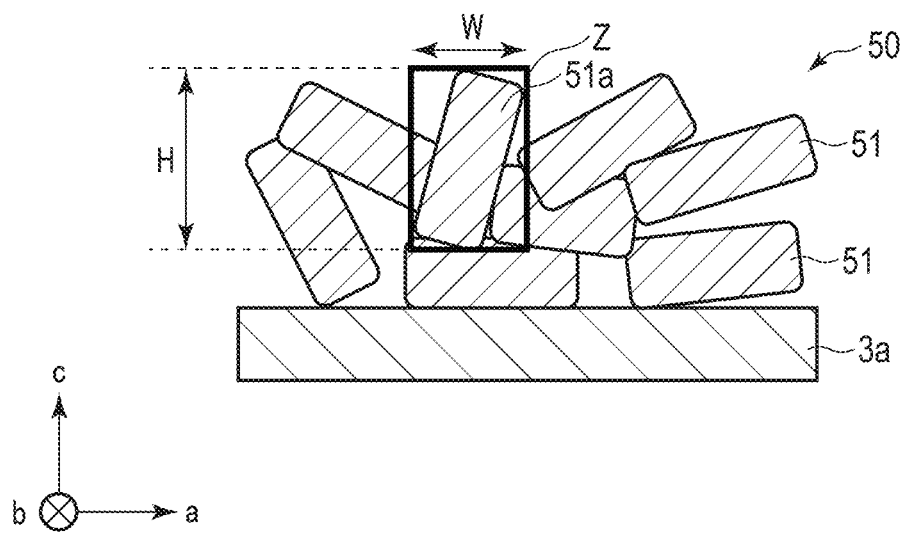
FIG. 6 is a view illustrating a bounding rectangle in a case where it is assumed that a cross section of the active material-containing layer shown in FIG. 3 is an SEM image.

This evaluation method will be described with reference to FIG. 6. FIG. 6 is a view illustrating a bounding rectangle of a certain niobium titanium composite oxide particle in a case where it is assumed that the cross section of the active material-containing layer shown in FIG. 3 is an SEM image. The active material-containing layer 50 includes a niobium titanium composite oxide particle 51a as one of the niobium titanium composite oxide particles. As regards the niobium titanium composite oxide particle 51a, a maximum height (H) in the stacking direction (thickness direction) of the electrode, and a maximum width (W) in the in-plane direction orthogonal to the stacking direction of the electrode, are measured. The niobium titanium composite oxide particle 51a is surrounded by a bounding rectangle Z which is defined by the maximum height (H) and maximum width (W).

As illustrated in FIG. 6, when the flat-shaped niobium titanium composite oxide particle 51a is standing, relative to the in-plane direction of the electrode, i.e. when the ratio (W/H) of the bounding rectangle Z defined by the maximum height (H) and maximum width (W) is less than 0.80, the probability is high that the [100] direction and [010] direction in the crystal structure of the niobium titanium composite oxide extend along the thickness direction of the electrode. In this case, although the Li diffusion coefficient in the [100] direction and [010] direction is high, the Li diffusion distance in the particle in the thickness direction of the electrode is long, and thus there is a tendency that the input/output characteristics and cycle characteristics deteriorate.

As regards a plurality of the niobium titanium composite oxide particles included in the active material-containing layer, by calculating the ratio of the bounding rectangle, it is possible to estimate in which direction the niobium titanium composite oxide particles in the active material-containing layer are directed as a whole.

Specifically, the electrode cross section as a target sample is observed by an SEM at an observation magnification of 5000, and the ratios of the bounding rectangles are calculated with respect to 200 niobium titanium composite oxide particles. Thereafter, an average value of the ratios is calculated. Note that a detailed procedure of SEM observation will be described later. When the average value of the ratios (W/H) of the bounding rectangles with respect to the 200 niobium titanium composite oxide particles is in a range of 0.80 to 1.5, the number of particles standing relative to the in-plane direction of the electrode is not excessively large, and also the number of particles lying in the in-plane direction of the electrode is not excessively large. In this case, since the balance between the diffusion rate of Li ions in the thickness direction of the electrode and the diffusion distance thereof is good, the input/output characteristics are excellent. It is more preferable that the average value of the ratios (W/H) of the bounding rectangles with respect to the 200 niobium titanium composite oxide particles is in a range of 0.80 to 1.0.

In the SEM image of the electrode cross section, the 200 niobium titanium composite oxide particles are selected at random from among particles each having an area of 0.1 $\mu m^2$ to 5 $\mu m^2$. In other words, each of the 200 niobium titanium composite oxide particles has an area of 0.1 $\mu m^2$ to 5 $\mu m^2$ in the SEM image of the electrode cross section. The niobium titanium composite oxide particle having this numerical range of the area is a particle having an average primary particle size or secondary particle size in the active material-containing layer. Therefore, by using, as targets, the niobium titanium composite oxide particles having such areas, it is possible to properly evaluate in which direction the niobium titanium composite oxide particles in the active material-containing layer are directed as a whole.

Hereinafter, other components of the electrode according to the embodiment will be described in detail.

The electrode according to the embodiment includes an active material-containing layer which is formed on a surface of a current collector, and a plurality of niobium titanium composite oxide particles. The active material-containing layer may be formed on one surface or both surfaces of the current collector. Each of the niobium titanium composite oxide particles may include a niobium titanium composite oxide. Each of the niobium titanium composite oxide particles may be composed of a niobium titanium composite oxide. The active material-containing layer may include an active material other than the niobium titanium composite oxide. The active material-containing layer can further include a conductive agent and a binder. The electrode according to the embodiment may be a negative electrode or a positive electrode. The electrode according to the embodiment is, for example, an electrode for a battery, or an electrode for a secondary battery.

The niobium titanium composite oxide has, for example, a monoclinic crystal structure. The niobium-titanium composite oxide is, for example, at least one selected from the group consisting of a composite oxide represented by General Formula $Li_xTi_{1-y}M1_yNb_{2-z}M2_zO_{7\pm\delta}$, and a composite oxide represented by General Formula $Li_xTi_{1-y}M3_{y+z}Nb_{2-z}O_{7-\delta}$. Here, M1 is at least one selected from the group consisting of Zr, Si, and Sn. M2 is at least one selected from the group consisting of V, Ta, and Bi. M3 is at least one selected from the group consisting of Mg, Fe, Ni, Co, W, Ta, and Mo. Each subscript in the composition formula satisfies $0 \leq x \leq 5$, $0 \leq y < 1$, $0 \leq z < 2$, and $-0.3 \leq \delta \leq 0.3$.

Specific examples of the niobium-titanium composite oxides include $Nb_2TiO_7$, $Nb_2Ti_2O_9$, $Nb_{10}Ti_2O_{29}$, $Nb_{14}TiO_{37}$, and $Nb_{24}TiO_{62}$. The ratio of Ti/Nb in the monoclinic niobium titanium composite oxide is determined in accordance with the design and purpose of use of the battery. From the standpoint that the active material capacity is not sacrificed, the ratio of Ti/Nb is, preferably, $1.5 \leq Nb/Ti < 5$. The monoclinic niobium-titanium composite oxide may be a substituted niobium-titanium composite oxide in which at least a part of Nb and/or Ti is substituted with a dopant. Examples of substitution elements include Na, K, Ca, Co, Ni, Si, P, V, Cr, Mo, Ta, Zr, Mn, Fe, Mg, B, Pb, and Al. The substituted niobium-titanium composite oxide may include one kind or two or more kinds of the substitution elements.

Examples of the active material other than the niobium titanium composite oxide include lithium titanate having a ramsdellite structure (e.g. $Li_{2+y}Ti_3O_7$, $0 \leq y \leq 3$), lithium titanate having a spinel structure (e.g. $Li_{4+x}Ti_5O_{12}$, $0 \leq x \leq 3$), monoclinic titanium dioxide ($TiO_2(B)$), anatase-type titanium dioxide, rutile-type titanium dioxide, a hollandite-type titanium composite oxide, and an orthorhombic titanium-containing composite oxide.

Examples of the orthorhombic titanium-containing composite oxide include a compound represented by $Li_{2+a}$ $M(I)_{2-b}Ti_{6-c}M(II)_dO_{14+σ}$. Here, M(I) is at least one selected from the group consisting of Sr, Ba, Ca, Mg, Na, Cs, Rb, and K. M(II) is at least one selected from the group consisting of Zr, Sn, V, Nb, Ta, Mo, W, Y, Fe, Co, Cr, Mn, Ni and Al. The respective subscripts in the composition formula are specified as follows: $0 \leq a \leq 6$, $0 \leq b < 2$, $0 \leq c < 6$, $0 \leq d < 6$, and $-0.5 \leq σ \leq 0.5$. Specific examples of the orthorhombic titanium-containing composite oxide include $Li_{2+a}Na_2Ti_6O_{14}$ ($0 \leq a \leq 6$).

The ratio of niobium titanium composite oxide particles to the active material particles included in the active material-containing layer is, for example, 50 mass % or more, and is, preferably, 80 mass % or more. This ratio may be 100 mass %.

The niobium titanium composite oxide particles may include at least either primary particle or secondary particles into which the primary particles are agglomerated. The primary particle, for example, may be compounded with carbon in the state in which at least a part of the surface of the primary particle is covered with a carbon-containing layer. The secondary particle may be an agglomerate of primary particles that are compounded with carbon. Alternatively, the secondary particle may be a secondary particle into which primary particles are agglomerated, the secondary particle being compounded with carbon in the state in which at least a part of the surface of the secondary particle is covered with a carbon-containing layer.

The tap density of niobium titanium composite oxide particles is, for example, in a range of 1.0 g/cm³ to 1.9 g/cm³, and preferably, in a range of 1.5 g/cm³ to 1.9 g/cm³. The tap density may be in a range of 1.6 g/cm³ to 1.9 g/cm³. That the tap density is high means that the bulk is low (the irregularities on the particle surfaces are small). Thus, when an electrode including niobium titanium composite oxide particles with a high tap density is fabricated, even if the electrode is pressed under a relatively weak pressure, a desired electrode density can be achieved. The reason for this is that active material particles with a low bulk tend to mutually smoothly move by the press. The desired electrode density is, for example, an electrode density of 2.2 g/cm³ to 3.0 g/cm³.

In addition, when an active material-containing layer including niobium titanium composite oxide particles with a high tap density is pressed under a weak press pressure, the orientation of the flat-shaped particle group is not excessively increased. Accordingly, when the tap density of niobium titanium composite oxide particles is in the above-described range, there is an advantageous effect that the electrode with the peak intensity ratio (Ia/Ib) in the range of 1.80 or more to 2.60 or less can easily be fabricated. If the tap density of niobium titanium composite oxide particles is out of the range of 1.0 cm³ to 1.9 g/cm², it is difficult to fabricate the electrode with the peak intensity ratio (Ia/Ib) in the range of 1.80 or more to 2.60 or less. If the tap density is excessively high, the specific surface area of niobium titanium composite oxide particles is small, and thus the reaction area of the niobium titanium composite oxide which allows Li ions to be inserted therein and extracted therefrom, is small. Thereby, there is a possibility that the rate characteristics deteriorate, and this is not preferable.

The BET specific surface area of niobium titanium composite oxide particles is, preferably, 0.1 m²/g or more to 5 m²/g or less. From the standpoint of setting the tap density within the above-described range, it is preferable that the number of pores of the active material is relatively small, and, for example, it is preferable that the BET specific surface area is 5 m²/g or less. If the BET specific surface area is less than 0.1 m²/g, it is possible that the number of sites, which can be related to extraction and insertion of lithium ions, is small. In this case, the capacity and cycle characteristics tend to deteriorate, and this is not preferable.

Here, in the measurement of the specific surface area, use is made of a method of causing the powder particle surface to adsorb molecules, whose adsorption occupation area is already known, at the temperature of liquid nitrogen, and calculating the specific surface area of the sample from the amount of the adsorption. A method, which is most frequently used, is a BET method by low-temperature, low-humidity physical adsorption of inert gas, and the BET method is a most famous theory as a calculation method of a specific surface area, in which the Langmuir theory that is a monomolecular layer adsorption theory is extended to polymolecular layer adsorption. The specific surface area calculated by this method is called the BET specific surface area.

The average particle size (D50) of niobium titanium composite oxide particles is, for example, in a range of 0.1 μm to 5.0 μm, and preferably, in a range of 1.0 μm to 4.0 μm, and more preferably, in a range of 2.5 μm to 3.5 μm. If the average particle size (D50) is less than 0.1 μm, the specific surface area is large and many gaps are present in the electrode, and thus it becomes difficult to increase the electrode density. As a result, the contact property between active material particles in the electrode and the contact property between the active material particles and the conductive agent or the like deteriorate, and the life performance tends to lower. In addition, since the specific surface area is large, the reactivity with the electrolyte increases, and the resistance increases by the formation of a side reaction product coat film on the electrode surface, and therefore the quick charge-and-discharge performance tends to deteriorate. On the other hand, if the average particle size (D50) is greater than 5 μm, the Li ion diffusion distance in the particle increases, and the quick charge-and-discharge performance tends to deteriorate. The average particle size D50 can be determined by particle size distribution measurement by a laser diffraction scattering method.

The average primary particle size of the niobium titanium composite oxide particles is, for example, in a range of 0.1 μm to 5 μm. The average secondary particle size of the niobium titanium composite oxide particles is, for example, in a range of 1 μm to 100 μm, and preferably, in a range of 5 μm to 30 μm. The average primary particle size and the average secondary particle size can be measured by SEM observation.

The aspect ratio of the niobium titanium composite oxide particle is, preferably, in a range of 1 to 4. The aspect ratio of the niobium titanium composite oxide particle means a ratio between the major axis and the minor axis of the particle. Typically, the [001] direction corresponding to the c-axis direction is the minor axis, and the [100] direction and/or [010] direction, which corresponds to the a-axis direction and/or b-axis direction, is the major axis. A niobium titanium composite oxide particle, in which the aspect ratio of the primary particle is 4 or more, has an excessively long Li diffusion distance, and this is not preferable. Thus, in this case, the generation of overvoltage, the decrease in Li insertion/extraction amount, and the side reaction on the reduction side, are promoted, and there is a possibility that the rate characteristics and the cycle deteriorate. It is preferable that the aspect ratio of the niobium titanium composite oxide particle is in a range of 1 to 3.

The conductive agent may be mixed in order to enhance the current collection performance, and to suppress a contact resistance between the active material and the current collector. Examples of the conductive agent include carbon materials, for instance, vapor grown carbon fiber (VGCF), carbon black such as acetylene black, graphene, graphite, carbon nanofiber, and carbon nanotube. One of these may be used as the conductive agent, or two or more of these may be combined and used as the conductive agent. Alternatively, instead of using the conductive agent, a carbon coat or an electron conductive inorganic material coat may be applied to the surface of the active material particle.

It is preferable that the active material-containing layer includes a carbon material as the conductive agent. As described above, the niobium titanium composite oxide has such a characteristic that the electrical conductivity thereof is low, but the electrical conductivity is conspicuously increased if the active material-containing layer includes the carbon material.

The bulk density of the carbon material is, preferably, in a range of 0.08 g/cm$^3$ to 0.15 g/cm$^3$. That the bulk density is high means that the bulk is low (the irregularities on the particle surface are small). Thus, when an electrode including a carbon material with a high bulk density is fabricated, even if the electrode is pressed under a relatively weak pressure, a desired electrode density can be achieved.

The active material-containing layer, which includes powder with a high tap density as the niobium titanium composite oxide particles, and includes a conductive agent with a high bulk density as the carbon material, can achieve a desired electrode density with a weak press pressure. Specifically, in this case, the orientation of the niobium titanium composite oxide particles does not excessively increase. Accordingly, when the tap density of the niobium titanium composite oxide particles is in the range of 1.0 g/cm$^3$ to 1.9 g/cm$^3$ and the bulk density of the carbon material is in the range of 0.08 g/cm$^3$ to 0.15 g/cm$^3$, the preferable electrode density can be achieved while preventing an increase of the orientation of the niobium titanium composite oxide particles. In this case, the peak intensity ratio (Ia/Ib), which is determined by X-ray diffraction with respect to the surface of the active material-containing layer, can be in the range of 1.80 or more to 2.60 or less.

The binder is added to fill gaps among the dispersed active material and also to bind the active material with the negative electrode current collector. Examples of the binder include polytetrafluoroethylene (PTFE), polyvinylidene fluoride (PVdF), fluorine rubber, styrene-butadiene rubber, polyacrylate compounds, imide compounds, carboxymethyl cellulose (CMC), and salts of CMC. One of these may be used as the binder, or two or more may be used in combination as the binder.

The mixing ratios of the active material particles, conductive agent, and the binder in the active material-containing layer can be appropriately changed depending on the application of the electrode. The active material-containing layer preferably includes therein the active material particles, the conductive agent, and the binder respectively in proportions of 70% by weight or more and 96% by weight or less, 2% by weight or more and 28% by weight or less, and 2% by weight or more and 28% by weight or less. The amount of the conductive agent is adjusted to 2% by weight or more, thereby allowing the current collecting performance of the active material-containing layer to be improved, and the large current characteristics of the secondary battery to be improved. Furthermore, the amount of the binder is adjusted to 2% by weight or more, thereby allowing the binding property between the active material-containing layer and the current collector to be enhanced, and the cycle characteristics to be improved. On the other hand, the conductive agent and the binder are preferably each 28% by weight or less for achieving increase in capacity.

The electrode density (not including the current collector) is, for example, in a range of 1.8 g/cm$^3$ or more to 3.3 g/cm$^3$ or less, and preferably, in a range of 2.2 g/cm$^3$ or more to 3.0 g/cm$^3$ or less. The electrode density is the density of the active material-containing layer. When the electrode density is in this range and the peak intensity ratio (Ia/Ib) is in the range of 1.80 or more to 2.60 or less, the conductive path between the niobium titanium composite oxide particles and the conductive agent is sufficiently formed, and, therefore, excellent input/output characteristics can be achieved.

A material that is electrochemically stable at a potential, at which lithium (Li) is inserted in and extracted from the active material, is used for the current collector. The current collector is preferably formed of, for example, copper, nickel, stainless steel, or aluminum, or an aluminum alloy including one or more elements selected from Mg, Ti, Zn, Mn, Fe, Cu and Si. It is preferable that the thickness of the current collector is 5 μm or more to 20 μm or less. The current collector with this thickness can strike a balance between the strength of the electrode and the reduction of the weight.

Besides, the current collector can include a part with a surface on which the active material-containing layer is not formed. This part can function as a current-collecting tab.

<Fabrication Method of Electrode>

The electrode according to the embodiment can be realized, for example, by mixing niobium titanium composite oxide particles with a low bulk, and a conductive agent with a low bulk and thus forming an active material-containing layer. Examples of the conductive agent with a low bulk include acetylene black and Ketjenblack. However, if the peak intensity ratio (Ia/Ib) is in the range of 1.80 or more to 2.60 or less in the X-ray diffraction with respect to the surface of the active material-containing layer, the kind of the conductive agent is not particularly limited.

The niobium titanium composite oxide particles with a low bulk, i.e. with a high tap density, can be obtained by raising the firing temperature to 1500° C. or above, when niobium titanium composite oxide particles are fabricated by a solid-phase method.

First, starting materials are mixed in a solid-phase method. As the starting material for the niobium-titanium composite oxide, an oxide or a salt including Li, Ti, and Nb is used. The salt used as the starting material is preferably a salt that decompose at relatively low temperature to form an oxide, such as a carbonate and nitrate. The particle size of these starting materials is preferably in the range of 0.1 μm to 10 μm, and more preferably in the range of 0.1 μm to 5 μm. This is because when the particle size is less than 0.1 μm, the starting materials tend to fly in the atmosphere during mixing, and the deviation of composition is likely to occur, whereas when the particle size is larger than 10 μm, unreacted products are formed.

When the starting raw materials are mixed, these are mixed at such a molar ratio that the Nb source and the Ti source have a target composition. The obtained mixture is pulverized to become as uniform as possible powder, and then fired. The firing is performed for 10 to 40 hours in a temperature range of 1500° C. to 1800° C. Thus, the niobium titanium composite oxide particles with a high tap density can be obtained. When the particles are exposed to temperatures near the melting point by firing, the particles are mutually bonded to relax the free energy of the particle surfaces, and are densified into a sintered body. Pores of particle gaps are lost during the process of densification. Therefore, as the firing temperature becomes higher, the pores become smaller, and, for example, at low temperatures not higher than 1500° C., it is difficult to obtain niobium titanium composite oxide particles with a high tap density. For example, as shown in Comparative Example 3 which will be described later, if the firing temperature is 1400° C., niobium titanium composite oxide particles with a tap density of 1.3 g/cm$^3$ are obtained.

The obtained active material (niobium titanium composite oxide powder), conductive agent and binder are suspended in a solvent, and a slurry is prepared. The slurry is applied to one surface or both surfaces of the current collector. Then, the applied slurry is dried, and a multilayer body of the active material-containing layer and the current collector is obtained. Thereafter, the multilayer body is subjected to pressing such as roll pressing. Thus, the electrode is fabricated.

The orientation of the niobium titanium composite oxide particles in the active material-containing layer and the ratio of the bounding rectangle can be changed by adjusting the tap density of the niobium titanium composite oxide particles that are used, the bulk density of the conductive agent, and the press conditions such as the press pressure and the drawing speed at a time of pressing.

Alternatively, the electrode may also be produced by the following method. First, active material, electro-conductive agent, and binder are mixed to obtain a mixture. Then, the mixture is formed into pellets. Then the electrode can be obtained by arranging the pellets on the current collector.

[Various Measurements]

<X-Ray Diffractometry of Electrode>

X-ray diffractometry with respect to the surface of the active material-containing layer is performed as follows.

To begin with, a secondary battery is set in a completely discharged state. For example, in a 25° C. environment, the battery is discharged until the rated end voltage or the battery voltage reaches 1.0 V with 0.1 C current, and this process is repeated multiple times. Thus, by bringing the current value at the time of discharge to $\frac{1}{100}$ or less, the battery can be set in the completely discharged state. Note that even in the completely discharged state, there is a case in which lithium ions are present.

The secondary battery including the electrode, which is set in the completely discharged state (State of Charge: 0%), is disassembled in a globe box filled with argon. The electrode that is the target of measurement is taken out from the disassembled secondary battery. This electrode is washed in a proper solvent, and then dried. The solvent used for washing is, for example, ethyl methyl carbonate.

The obtained electrode is cut to a predetermined size, and then fixed on a glass plate. The glass plate, on which the electrode sample is fixed, is attached to an X-ray diffraction apparatus, and a diffraction pattern is obtained by irradiating X-rays of a Cu-Kα ray source. As the X-ray diffraction apparatus, for example, use can be made of the SmartLab manufactured by Rigaku Corporation, or an apparatus having an equivalent function. Measurement conditions are set such that Cu-Kα rays are used as a ray source, scan is performed with 2θ being in a range of 10° to 90°, and the scan speed is 0.2°/sec.

Since the composition and density vary in accordance with the electrode that is the object, the thickness of the active material-containing layer is different. If the X-ray irradiation position in the thickness direction of the electrode is different, the diffraction angle will shift. In order to avoid this, the thickness of the electrode is measured in advance by a thickness meter, and the sample position is adjusted such that X-rays are radiated on the outermost surface of the electrode (active material-containing layer). Thereby, even if film thicknesses are different between a plurality of electrode samples, an error in the peak position can be eliminated.

In the obtained diffraction diagram, background elimination and Kα2 ray elimination are performed. A peak A with a highest intensity in a range of 2θ=26°±0.2° and a peak B with a highest intensity in a range of 2θ=23.9°±0.2° can be determined. In addition, from the intensities of these peaks, the peak intensity ratio (Ia/Ib) can be calculated.

<SEM Observation of Electrode Cross Section, and Calculation of Ratio of Bounding Rectangle>

The SEM observation of the electrode cross section is performed as follows. To begin with, the electrode that was taken out from the secondary battery as described above is cut in a direction parallel to the transverse direction of the electrode by utilizing an Ar ion milling apparatus, and the cross section of the active material-containing layer is exposed. At this time, the electrode is cut along the transverse direction at a position where the length of the electrode in the longitudinal direction is halved. The electrode is attached to a SEM sample table such that the exposed cross section of the active material-containing layer can be observed. In order to increase the contrast between the active material and other materials, photography is performed by a backscattered electron image in which information of the composition of materials is reflected. The observation magnification is set at 5000. With this magnification, the shapes of particles can be discriminated, and many particles can be photographed at a time, and this is preferable. In addition, at the time of photography, in order to make it possible to understand the thickness direction and in-plane direction of the electrode, photography is performed such that the current collector is situated in the horizontal direction (in-plane direction of the electrode), or the active material-containing layer and the current collector are included in the same view field. The horizontal direction of the current collector in the SEM image is a direction in which the surface of the current collector extends, and is an in-plane direction of the electrode.

Next, in order to obtain data of shapes of particles, image analysis software is used. As the image analysis software, for example, ImageJ shown in Non-Patent Literature "Dr. Michael et al., Image Processing with ImageJ, Reprinted from the July 2004 issue of Biophotonics International copyrighted by Laurin Publishing Co. INC." can be used. The photographed SEM image is binarized by an algorithm (Non-Patent Literature "J. C. Yen, IEEE Transactions on, 4(3), pp 370-378 (1995)") based on a maximum correlation value, which was developed by Yen, et al. Further, an image arithmetic operation called "Erode", which excludes pixels from a boundary portion of the target object, is performed, thereby clarifying the boundary of each particle. Thereafter, 200 particles each having an area of 0.1 μm$^2$ to 5 μm$^2$ are selected at random. As regards each of the selected 200 particles, a maximum height (H) along the thickness direction of the electrode and a maximum width (W) along the in-plane direction orthogonal to the stacking direction of the electrode are measured, and the ratio (W/H) of the bounding rectangle is calculated. The obtained values of the ratios of 200 bounding rectangles are averaged, and an average value of the obtained values is calculated.

<Measuring Method of Tap Density of Niobium Titanium Composite Oxide Particles>

The tap density of niobium titanium composite oxide particles is measured according to JIS Z 2512:2012. To begin with, the electrode taken out from the secondary battery by the above-described procedure is immersed in a straight-chain carbonate solution for five minutes. The electrode is taken out from the straight-chain carbonate solution, and dried in a vacuum for one hour. Then, the active material-containing layer is scratched by a spatula, and powder is obtained. The obtained powder is put in a crucible, and the temperature is raised up to 1000° C. in an oxygen gas flow, thereby removing the conductive agent and binder. Thus, niobium titanium composite oxide powder can be obtained.

The obtained powder is filled in a graduated measuring cylinder by an amount of 50 mL or more, and the surface of the powder is evened out. The surface of the powder is tapped by using a tapping apparatus, and the volume of the powder after 100 times of tapping is measured. After the 100 times of tapping, further tapping is repeated. At this time, the volume of the powder is measured after each tapping, and the tap density is calculated from the volume at a time when a volume difference from the previous tapping falls within 1%.

<Aspect Ratio Measurement of Niobium Titanium Composite Oxide Particles>

The aspect ratio of a primary particle can be obtained by, for example, the following method. To begin with, an electrode sample after washing, which was obtained by the method described in the above item of the X-ray diffractometry, is prepared. Then, using a scanning electron microscope (SEM), the electrode sample is photographed at a magnification of 5000 or more to 50000 or less with which primary particles can be clearly viewed. Next, a primary particle, the entirety of which can be viewed, is selected from the primary particles of the niobium titanium composite oxide, which appear in the SEM image. Then, this primary particle is approximated to an ellipse. At the time of the approximation, the ratio of the major axis and minor axis of the ellipse is set such that the difference between the contour of the primary particle and the contour of the circumference of the ellipse becomes minimum. Subsequently, the lengths of the major axis and minor axis of the ellipse are measured. The thus obtained lengths of the major axis and minor axis of the ellipse can be regarded as the lengths of the major axis and minor axis of the primary particle. Similar operations are performed for 50 SEM images which are arbitrarily selected, and an arithmetic mean value L of the lengths of the major axes of the primary particles and an arithmetic mean value S of the lengths of the minor axes of the primary particles are calculated. The ratio L/S between the thus obtained arithmetic mean value L of the lengths of the major axes of the primary particles and the arithmetic mean value S of the lengths of the minor axes is set as a mean value of the aspect ratios of primary particles.

<Measuring Method of Bulk Density of Carbon Material>

To begin with, the electrode taken out from the secondary battery by the above-described procedure is immersed in an ethyl methyl carbonate solution for five minutes. The electrode is taken out from the ethyl methyl carbonate solution, and dried in a vacuum for one hour. Then, the active material-containing layer is scratched by a spatula, and powder is obtained. The obtained powder is put in hydrofluoric acid, and stirred, thereby dissolving the niobium titanium composite oxide. Thereafter, carbon material powder is obtained by filtering.

The obtained powder is dried at a temperature of 120° C. for one hour. The dried powder is filled in a container having a volume of 50 mL, and overflowing powder is leveled off. In other words, the powder is filled in the container such that the volume of the powder becomes just 50 mL. From the total mass of the container and powder at this time, the mass of the container that is empty is deducted to measure the mass of the powder, and the bulk density is calculated.

According to the first embodiment, an electrode is provided. The electrode includes a current collector, and an active material-containing layer which is formed on a surface of the current collector and includes a plurality of niobium titanium composite oxide particles. A X-ray diffraction pattern using a Cu-Kα ray source with respect to a surface of the active material-containing layer includes a peak A with a highest intensity in a range of $2\theta=26°\pm0.2°$ and a peak B with a highest intensity in a range of $2\theta=23.9°\pm0.2°$. An intensity ratio (Ia/Ib) between an intensity Ia of the peak A and an intensity Ib of the peak B is in a range of 1.80 or more to 2.60 or less.

In the electrode according to the embodiment, since an excessive increase of orientation of niobium titanium composite oxide particles in the active material-containing layer is suppressed, lithium ions tend to more easily diffuse in the thickness direction of the electrode. Therefore, the electrode according to the embodiment can achieve excellent input/output characteristics.

Second Embodiment

According to the second embodiment, a secondary battery including a negative electrode, a positive electrode, and an electrolyte is provided. The secondary battery includes the electrode according to the first embodiment as the negative electrode.

The secondary battery additionally can be equipped with a separator disposed between the positive electrode and the negative electrode. The negative electrode, the positive electrode, and the separator can constitute an electrode group. The electrolyte can be held in the electrode group.

The secondary battery additionally can be equipped with a container member that houses the electrode group and the electrolyte.

Furthermore, the secondary battery additionally can be equipped with a negative electrode terminal electrically connected to the negative electrode and a positive electrode terminal electrically connected to the positive electrode.

The secondary battery can be, for example, a lithium secondary battery. The secondary battery may be a nonaqueous electrolyte secondary battery including a nonaqueous electrolyte.

Hereinafter, the negative electrode, the positive electrode, the electrolyte, the separator, the container member, the negative electrode terminal, and the positive electrode terminal will be described in detail.

(1) Negative Electrode

A negative electrode included in the secondary battery according to the second embodiment may be, for example, the electrode described in the first embodiment. The active material-containing layer contained in this electrode may be a negative electrode active material-containing layer. The active material particles included in the electrode may be negative electrode active material particles.

(2) Positive Electrode

The positive electrode can include a positive electrode current collector and a positive electrode active material-containing layer. The positive electrode active material-containing layer can be formed on one side or both sides of the positive electrode current collector. The positive electrode active material-containing layer can contain a positive electrode active material, and optionally a conductive agent and a binder.

Examples of the positive electrode active material include oxides and sulfides. The positive electrode may include, as the positive electrode active material, one type of compound or two or more different types of compounds. Examples of the oxides and the sulfides may include compounds allowing lithium or lithium ions to be inserted thereinto or extracted therefrom.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{1-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, $y+z<1$).

Among the above, examples of compounds more preferable as the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, $y+z<1$). The positive electrode potential can be made high by using these positive electrode active materials.

When a room temperature molten salt is used as the electrolyte of the battery, it is preferable to use a positive electrode active material including lithium iron phosphate, $Li_xVPO_4F$ ($0\leq x\leq1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The positive electrode active material may preferably have primary particle sizes in the range of 100 nm to 1 μm. The positive electrode active material having primary particle sizes of 100 nm or more may be easy to handle in industrial applications. The positive electrode active material having primary particle sizes of 1 μm or less may allow lithium ions to be smoothly diffused in solid.

The positive electrode active material may preferably have a specific surface area in the range of 0.1 $m^2$/g to 10 $m^2$/g. The positive electrode active material having a specific surface area of 0.1 $m^2$/g or more may secure an adequately large site for insertion and extraction of Li ions. The positive electrode active material having a specific surface area of 10 $m^2$/g or less may be easy to handle in industrial applications and may ensure a favorable charge-and-discharge cycle.

The binder is blended in order to fill a gap between the dispersed positive electrode active materials and to bind the positive electrode active material and the positive electrode current collector. Examples of the binder include polytetrafluoroethylene (PTFE), polyvinylidene fluoride (PVdF), fluorine rubber, polyacrylic acid compounds, imide compounds, carboxy methyl cellulose (CMC), and salts of CMC. One of these may be used as the binder, or a combination of two or more thereof may be used as the binder.

A conductive agent is added in order to increase the current-collecting performance and suppress the contact resistance between the positive electrode active material and the positive electrode current collector. Examples of the conductive agent include carbonaceous materials such as vapor grown carbon fibers (VGCF), carbon black such as acetylene black, graphite, carbon nanofibers and carbon nanotubes. One of these materials may be used as the conductive agent, or two or more of these materials may be combined and used as the conductive agent. In addition, the conductive agent can be omitted.

In the positive electrode active material-containing layer, it is preferable to combine the positive electrode active material and the binder in a mass ratio of the positive electrode active material in a range from 80% to 98% and the binder in a range from 1° to 20°.

By making the amount of the binder be 1° by mass or greater, sufficient electrode strength is obtained. In addition, the binder may function as an insulator. For this reason, if the amount of the binder is kept at 20% by mass or less, the amount of insulation contained in the electrode is decreased, and therefore the internal resistance can be reduced.

In the case of adding the conductive agent, it is preferable to combine the positive electrode active material, the binder, and the conductive agent in a mass ratio of the positive electrode active material in a range from 77% to 95%, the binder in a range from 1% to 20%, and conductive agent in a range from 3% to 15%.

By making the amount of the conductive agent be 3% by mass or greater, the effects described above can be exhibited. Also, by keeping the amount of the conductive agent to 15% by mass or less, the proportion of the conductive agent in contact with electrolyte can be lowered. If this proportion is low, decomposition of the electrolyte under high-temperature storage can be reduced.

The positive electrode current collector is preferably an aluminum foil or an aluminum alloy foil containing one or more elements selected from Mg, Ti, Zn, Ni, Cr, Mn, Fe, Cu, and Si.

The thickness of the aluminum foil or aluminum alloy foil is preferably within a range from 5 μm to 20 μm, and is more preferably 15 μm or less. The purity of the aluminum foil is preferably 99% by mass or more. The content of transition metals such as iron, copper, nickel, and chromium contained in the aluminum foil or aluminum alloy foil is preferably 1% by mass or less.

In addition, the positive electrode current collector can include a portion where the positive electrode active material-containing layer is not formed on the surface thereof. This portion can serve as a positive electrode tab.

The positive electrode can be produced, for example, by the following method. First, an active material, a conductive agent, and a binder are suspended in a solvent to prepare a slurry. This slurry is applied to one side or both sides of the current collector. Next, the applied slurry is dried to obtain a laminate of the active material-containing layer and the current collector. Thereafter, the laminate is pressed. The positive electrode is thus produced.

Alternatively, the positive electrode may be produced by the following method. First, an active material, a conductive agent, and a binder are mixed to obtain a mixture. The mixture is then formed into pellets. Subsequently, these pellets can be arranged on the current collector to obtain a positive electrode.

(3) Electrolyte

Examples of the electrolyte may include nonaqueous liquid electrolyte or nonaqueous gel electrolyte. The nonaqueous liquid electrolyte may be prepared by dissolving an electrolyte salt used as solute in an organic solvent. The electrolyte salt may preferably have a concentration in the range of 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVDF), polyacrylonitrile (PAN), polyethylene oxide (PEO), and mixtures thereof.

Alternatively, besides the nonaqueous liquid electrolyte and the nonaqueous gel electrolyte, a room-temperature molten salt (ionic melt) containing lithium ions, a polymer solid electrolyte, an inorganic solid electrolyte, and the like may also be used as the nonaqueous electrolyte.

The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

A polymer solid electrolyte is prepared by dissolving an electrolyte salt into a polymer material and solidifying the result.

An inorganic solid electrolyte is solid material having Li-ion conductivity.

The electrolyte may also be an aqueous electrolyte containing water.

The aqueous electrolyte includes an aqueous solvent and an electrolyte salt. The aqueous electrolyte is liquid, for example. A liquid aqueous electrolyte is an aqueous solution prepared by dissolving an electrolyte salt as the solute in an aqueous solvent. The aqueous solvent is a solvent containing 50% or more water by volume, for example. The aqueous solvent may also be pure water.

The aqueous electrolyte may also be an aqueous gel composite electrolyte containing an aqueous electrolytic solution and a polymer material. The polymer material may be, for example, polyvinylidene fluoride (PVDF), polyacrylonitrile (PAN), or polyethylene oxide (PEO).

The aqueous electrolyte preferably contains 1 mol or greater of aqueous solvent per 1 mol of the salt as the solute. In an even more preferably aspect, the aqueous electrolyte contains 3.5 mol or greater of aqueous solvent per 1 mol of the salt as the solute.

That the aqueous electrolyte contains water can be confirmed by gas chromatography-mass spectrometry (GC-MS) measurement. Also, the salt concentration and the amount of water contained in the aqueous electrolyte can be computed by measurement using inductively coupled plasma (ICP) emission spectroscopy or the like, for example. By measuring out a prescribed amount of the aqueous electrolyte and computing the contained salt concentration, the molar concentration (mol/L) can be computed. Also, by measuring the specific gravity of the aqueous electrolyte, the number of moles of the solute and the solvent can be computed.

The aqueous electrolyte is prepared by dissolving the electrolyte salt into the aqueous solvent at a concentration from 1 to 12 mol/L for example.

To suppress electrolysis of the aqueous electrolyte, LiCH, $Li_2SO_4$, or the like can be added to adjust the pH. The pH is preferably from 3 to 13, and more preferably from 4 to 12.

(4) Separator

The separator is formed of, for example, a porous film containing polyethylene (polyethylene; PE), polypropylene (polypropylene; PP), cellulose, or polyvinylidene fluoride (PVdF), or a synthetic resin nonwoven fabric. From the viewpoint of safety, it is preferable to use a porous film formed from polyethylene or polypropylene. This is because these porous films can be melted at a predetermined temperature to interrupt the current.

(5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped.

The container member may be appropriately selected depending on battery size and use of the battery.

(6) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

(7) Positive Electrode Terminal

The positive electrode terminal may be made of, for example, a material that is electrically stable in the potential range of 3 V to 5 V (vs. Li/Li$^+$) relative to the redox potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the embodiment will be described in detail with reference to the drawings.

Figure 7:
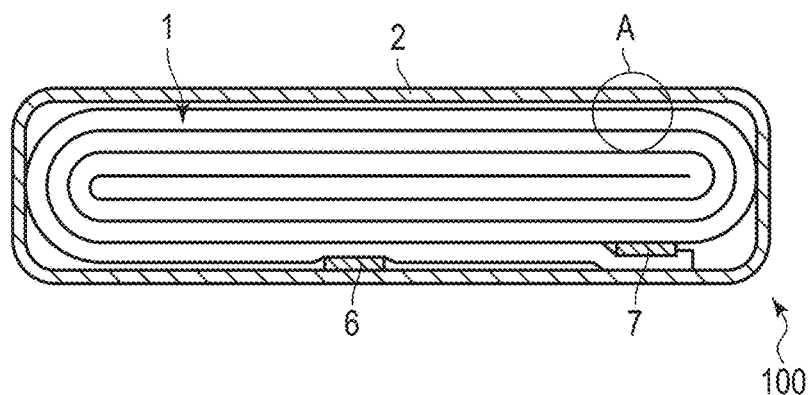
FIG. 7 is a cross-sectional view schematically illustrating an example of a secondary battery according to an embodiment.
Figure 8:
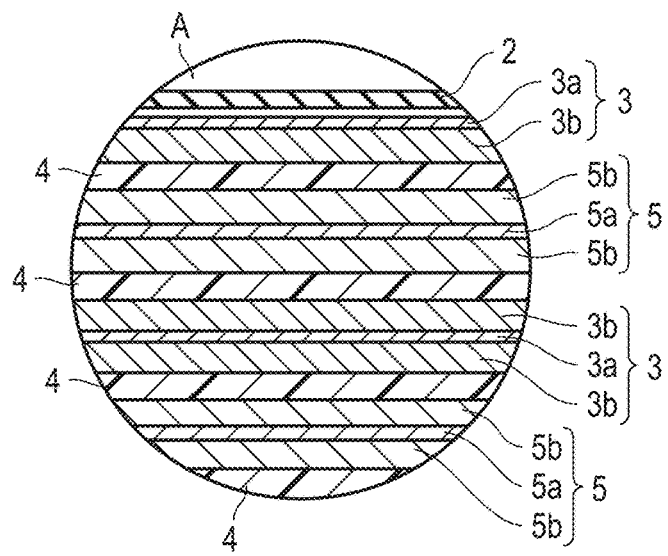
FIG. 8 is an enlarged cross-sectional view of a part A of the secondary battery illustrated in FIG. 7.

FIG. 7 is a sectional view schematically showing one example of a secondary battery according to an embodiment. FIG. 8 is an enlarged sectional view of a portion A of the secondary battery shown in FIG. 7.

The secondary battery 100 shown in FIG. 7 and FIG. 8 includes a bag-shaped container member 2 shown in FIG. 7, an electrode group 1 shown in FIG. 7 and FIG. 8, and an electrolyte (not shown). The electrode group 1 and the electrolyte are stored in the bag-shaped container member 2. The electrolyte (not shown) is held in the electrode group 1.

The bag-shaped container member 2 is formed from a laminate film including two resin layers and a metal layer disposed therebetween.

As shown in FIG. 7, the electrode group 1 is a flat wound electrode group. The flat wound electrode group 1 includes negative electrodes 3, separators 4, and positive electrodes 5 as shown in FIG. 8. The separator 4 is disposed between the negative electrode 3 and the positive electrode 5.

A negative electrode 3 includes a negative electrode current collector 3a and negative electrode active material-containing layers 3b. In the portion of the negative electrode 3 located at the outermost shell of a wound electrode group 1, the negative electrode active material-containing layer 3b is formed only on the inside surface side of the negative electrode current collector 3a, as shown in FIG. 8. In another portion of the negative electrode 3, the negative electrode active material-containing layer 3b is formed on both sides of the negative electrode current collector 3a.

A positive electrode 5 includes a positive electrode current collector 5a and a positive electrode active material-containing layer 5b formed on both sides thereof.

As shown in FIG. 7, a negative electrode terminal 6 and a positive electrode terminal 7 are positioned near the outer end of the wound electrode group 1. The negative electrode terminal 6 is connected to the outermost part of the negative electrode current collector 3a. In addition, the positive electrode terminal 7 is connected to the outermost part of the positive electrode current collector 5a. The negative electrode terminal 6 and the positive electrode terminal 7 extend outward from opening portions of the bag-shaped container member 2. A thermoplastic resin layer is provided on the inner surface of the bag-shaped container member 2, and the opening of the bag-shaped container member 2 are closed by thermal fusion bonding of the thermoplastic resin layer.

Figure 9:
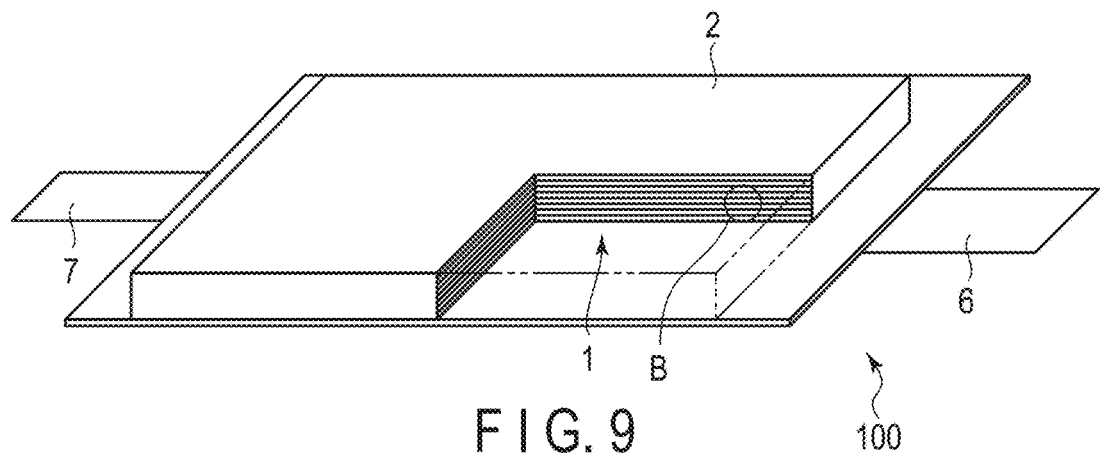
FIG. 9 is a partially cut-out perspective view schematically illustrating another example of the secondary battery according to the embodiment.
Figure 10:
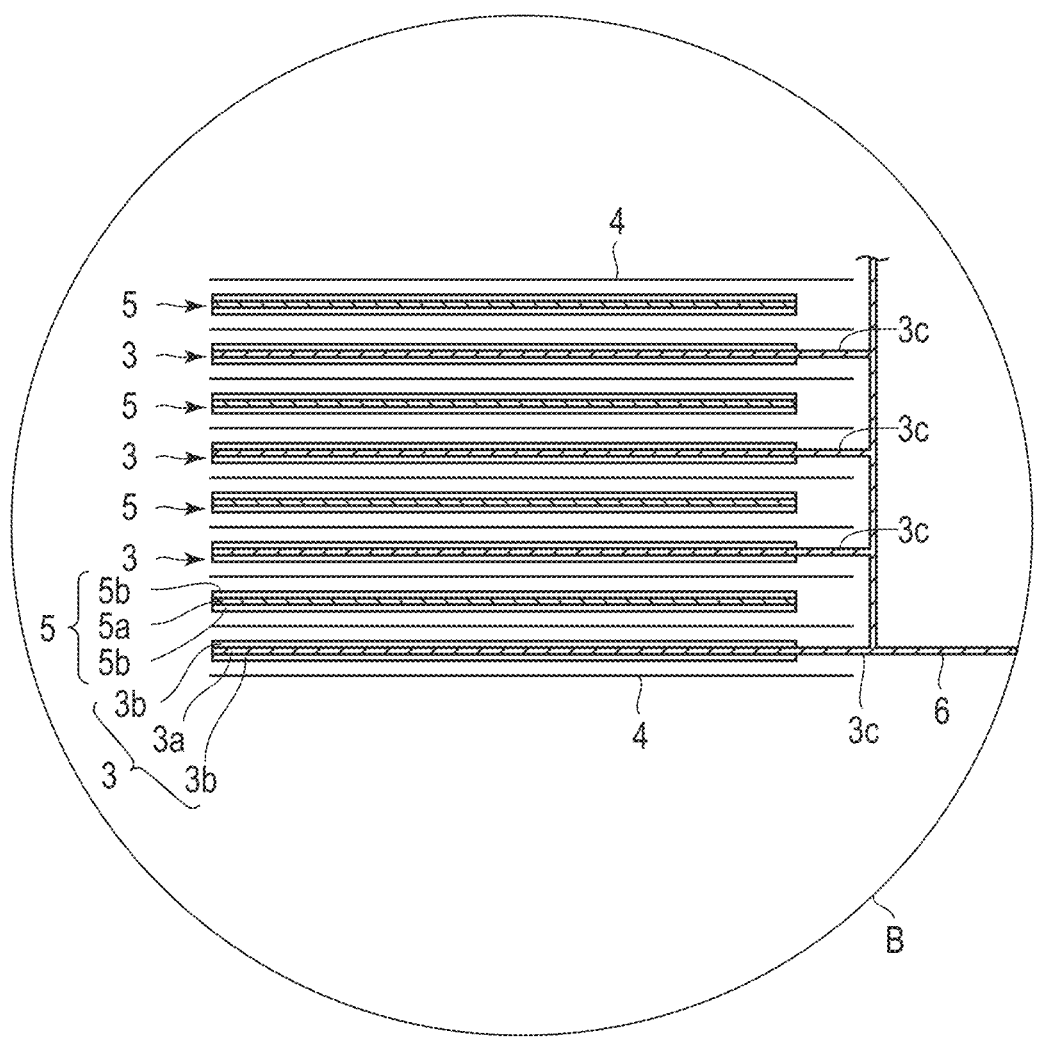
FIG. 10 is an enlarged cross-sectional view of a part B of the secondary battery illustrated in FIG. 9.

The secondary battery according to the embodiment is not limited to the secondary battery having the structure shown in FIGS. 7 and 8, and may be, for example, a battery having a structure shown in FIGS. 9 and 10.

FIG. 9 is a partial cut-away sectional perspective view schematically showing another example of the secondary battery according to the embodiment. FIG. 10 is an enlarged sectional view of a portion B of the secondary battery shown in FIG. 9.

The secondary battery 100 shown in FIGS. 9 and 10 includes an electrode group 1 shown in FIGS. 9 and 10, a container member 2 shown in FIG. 9, and an electrolyte (not shown). The electrode group 1 and the electrolyte are stored in the container member 2. The electrolyte is held in the electrode group 1.

The container member 2 is made of a laminate film including two resin layers and a metal layer intervening therebetween.

As shown in FIG. 10, the electrode group 1 is a laminated electrode group. The laminated electrode group 1 has a structure in which a negative electrode 3 and a positive electrode 5 are alternately laminated with a separator 4 intervening therebetween.

The electrode group 1 includes a plurality of the negative electrodes 3. The plurality of negative electrodes 3 are each provided with a negative electrode current collector 3a and a negative electrode active material-containing layer 3b carried on both sides of the negative electrode current collector 3a. Further, the electrode group 1 includes a plurality of the positive electrodes 5. The plurality of positive electrodes 5 are each provided with a positive electrode current collector 5a and a positive electrode active material-containing layer 5b carried on both sides of the positive electrode current collector 5a.

The negative electrode current collector 3a of each negative electrode 3 includes a portion 3c on one side where the negative electrode active material-containing layer 3b is not carried on any surfaces. This portion 3c acts as a negative electrode tab. As shown in FIG. 10, the portion 3c acting as the negative electrode tab does not overlap the positive electrode 5. In addition, a plurality of negative electrode tabs (portion 3c) is electrically connected to a belt-shaped negative electrode terminal 6. A tip of the belt-shaped negative electrode terminal 6 is drawn outward from a container member 2.

In addition, although not shown, the positive electrode current collector 5a of each positive electrode 5 includes a portion on one side where the positive electrode active material-containing layer 5b is not carried on any surfaces. This portion acts as a positive electrode tab. Like the negative electrode tab (portion 3c), the positive electrode tab does not overlap the negative electrode 3. In addition, the positive electrode tab is positioned on the opposite side of the electrode group 1 with respect to the negative electrode tab (portion 3c). The positive electrode tab is electrically connected to a belt-shaped positive electrode terminal 7. A tip of the belt-shaped positive electrode terminal 7 is positioned on the opposite side to the negative electrode terminal 6 and is drawn outward from the container member 2.

The secondary battery according to the second embodiment includes the electrode according to the first embodiment. Therefore, the secondary battery according to the second embodiment can achieve excellent cycle life characteristics.

Third Embodiment

According to the third embodiment, a battery module is provided. The battery module according to the third embodiment is equipped with a plurality of the secondary batteries according to the second embodiment.

In the battery module according to the embodiment, individual unit cells may be electrically connected in series or in parallel, or may be arranged in combination of series connection and parallel connection.

Next, an example of the battery module according to the embodiment will be described with reference to the drawings.

Figure 11:
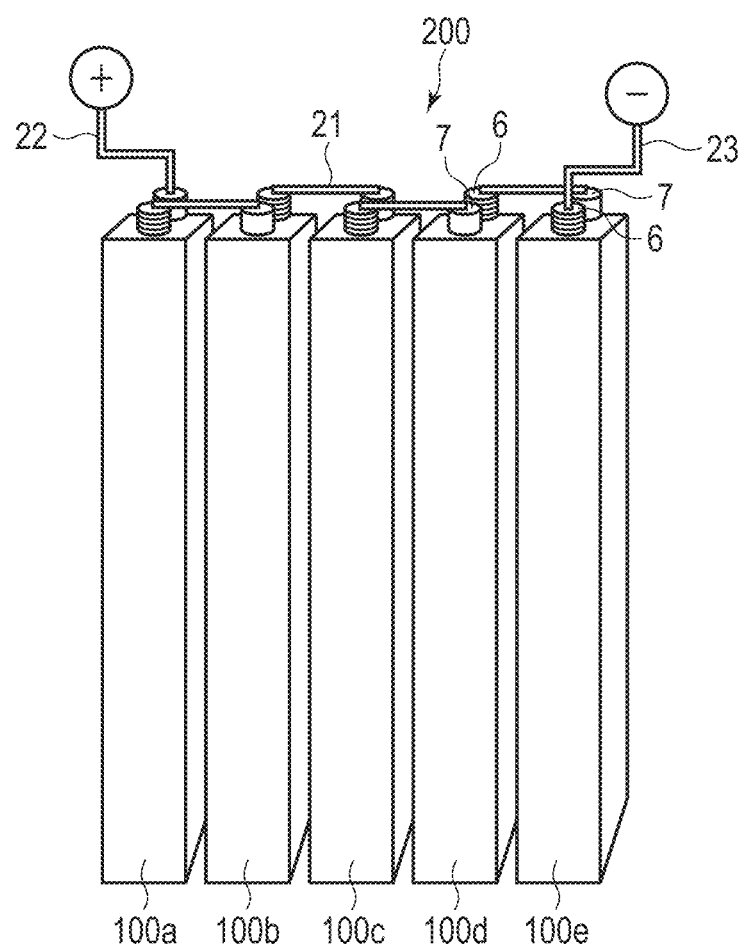
FIG. 11 is a perspective view schematically illustrating an example of a battery module according an embodiment.

FIG. 11 is a perspective view schematically showing an example of the battery module according to the embodiment. The battery module 200 shown in FIG. 11 includes five unit cells 100a to 100e, four bus bars 21, a positive electrode-side lead 22, and a negative electrode-side lead 23. Each of the five unit cells 100a to 100e is the secondary battery according to the second embodiment.

The busbar 21 connects a negative electrode terminal 6 of a single unit cell 100a to a positive electrode terminal 7 of an adjacently positioned unit cell 100h. In this way, the five unit cells 100a to 100e are connected in series by the four bus bars 21. That is, the battery module 200 shown in FIG. 11 is a battery module of five in-series connection. Although an example is not illustrated, in a battery module containing a plurality of unit cells electrically connected in parallel, the plurality of unit cells may be electrically connected by connecting the plurality of negative electrode terminals to each other with busbars and also connecting the plurality of positive electrode terminals to each other with busbars, for example.

The positive electrode terminal 7 of at least one battery among the five unit cells 100a to 100e is electrically connected to a positive electrode lead 22 for external connection. Also, the negative electrode terminal 6 of at least one battery among the five unit cells 100a to 100e is electrically connected to a negative electrode lead 23 for external connection.

The battery module according to the third embodiment includes the secondary battery according to the second embodiment. Therefore, the battery module according to the third embodiment can achieve excellent cycle life characteristics.

Fourth Embodiment

According to the fourth embodiment, a battery pack is provided. The battery pack includes the battery module according to the third embodiment. The battery pack may also be equipped with a single secondary battery according to the second embodiment instead of the battery module according to the third embodiment.

The battery pack according to the embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the embodiment will be described with reference to the drawings.

Figure 12:
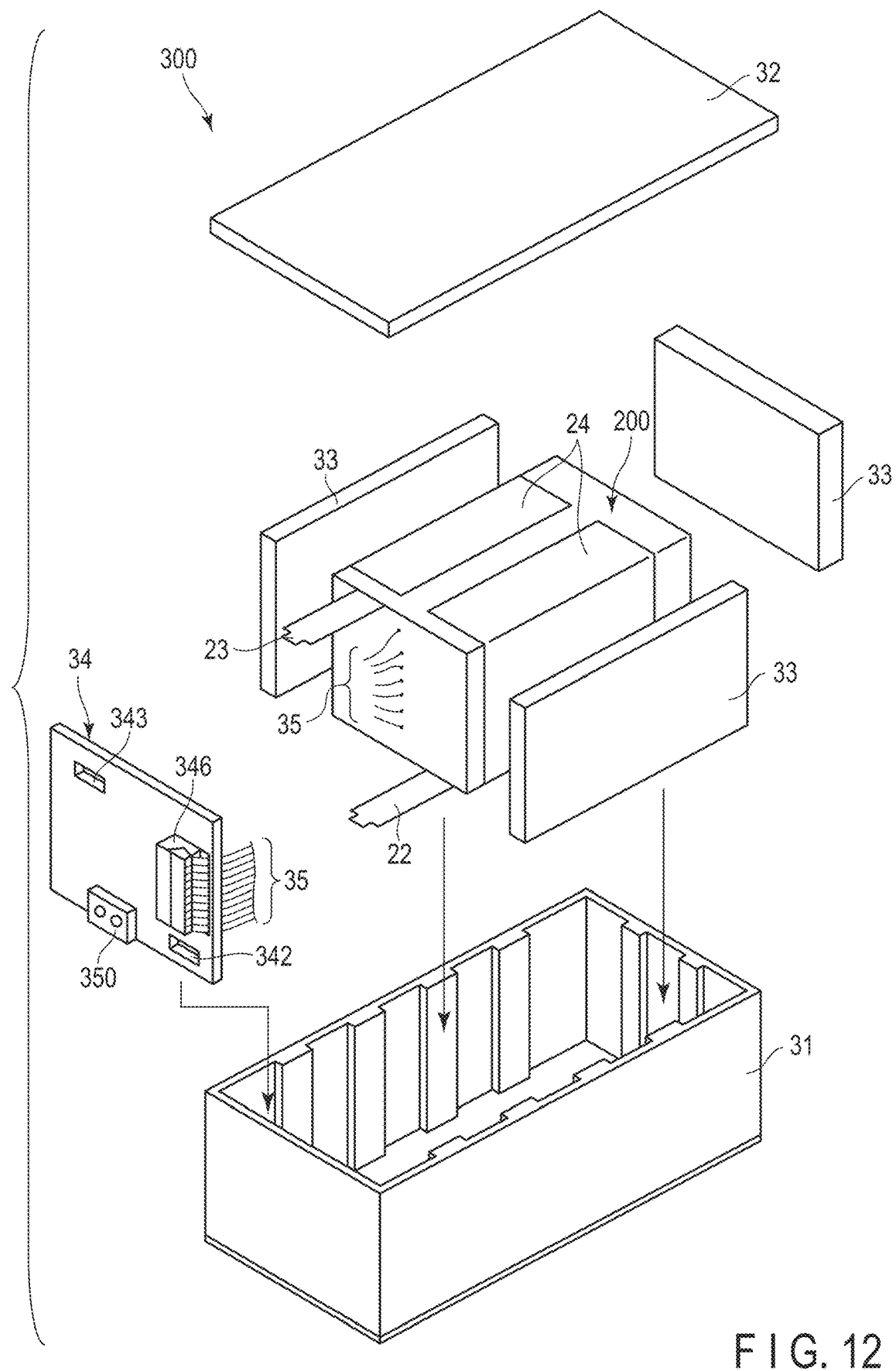
FIG. 12 is an exploded perspective view schematically illustrating an example of a battery pack according to an embodiment.
Figure 13:
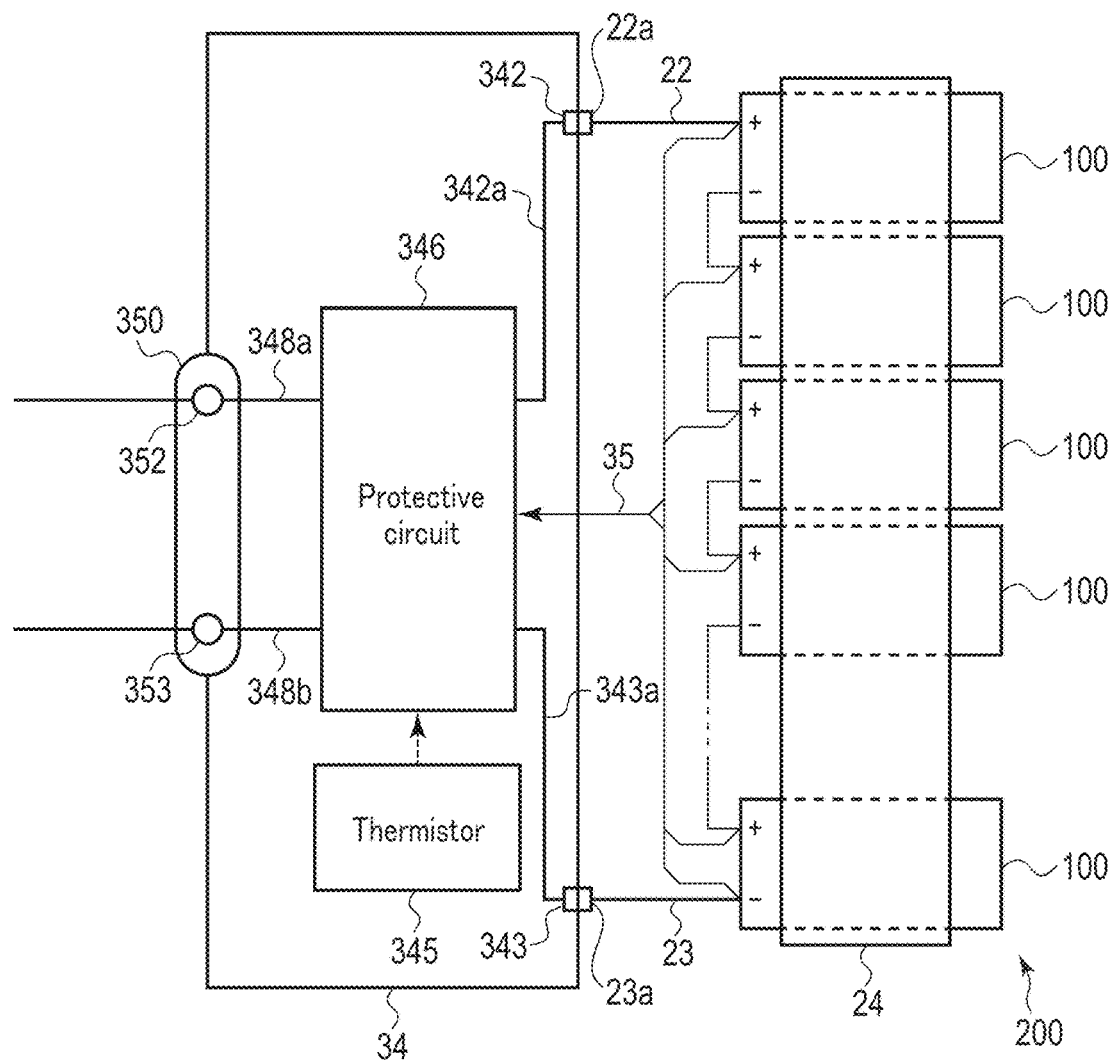
FIG. 13 is a block diagram illustrating an example of an electric circuit of the battery pack illustrated in FIG. 12.

FIG. 12 is an exploded perspective view schematically showing an example of the battery pack according to the embodiment. FIG. 13 is a block diagram showing an example of an electric circuit of the battery pack shown in FIG. 12.

A battery pack 300 shown in FIGS. 12 and 13 includes a housing container 31, a lid 32, protective sheets 33, a battery module 200, a printed wiring board 34, wires 35, and an insulating plate (not shown).

A housing container 31 shown in FIG. 12 is a bottomed-square-shaped container having a rectangular bottom surface. The housing container 31 is configured to house protective sheet 33, a battery module 200, a printed wiring board 34, and wires 35. A lid 32 has a rectangular shape. The lid 32 covers the housing container 31 to house the battery module 200 and the like. Although not shown, opening(s) or connection terminal(s) for connecting to external device(s) and the like are provided on the housing container 31 and lid 32.

The battery module 200 includes plural unit cells 100, a positive electrode-side lead 22, a negative electrode-side lead 23, and an adhesive tape 24.

At least one in the plurality of unit cells 100 is a secondary battery according to the second embodiment. Each unit cell 100 in the plurality of unit cells 100 is electrically connected in series, as shown in FIG. 13. The plurality of unit cells 100 may alternatively be electrically connected in parallel, or connected in a combination of in-series connection and in-parallel connection. If the plurality of unit cells 100 is connected in parallel, the battery capacity increases as compared to a case where they are connected in series.

The adhesive tape 24 fastens the plural unit cells 100. The plural unit cells 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural unit cells 100.

One terminal of a positive electrode lead 22 is connected to a battery module 200. One terminal of the positive electrode lead 22 is electrically connected to the positive electrode of one or more unit cells 100. One terminal of a negative electrode lead 23 is connected to the battery module 200. One terminal of the negative electrode lead 23 is electrically connected to the negative electrode of one or more unit cells 100.

The printed wiring board 34 is arranged on the inner surface of the housing container 31 along the short side direction. The printed wiring board 34 includes a positive electrode connector 342, a negative electrode connector 343, a thermistor 345, a protective circuit 346, wirings 342a and 343a, an external power distribution terminal 350, a plus-side wire (positive-side wire) 348a, and a minus-side wire (negative-side wire) 348b. One principal surface of the printed wiring board 34 faces one side surface of the battery module 200. An insulating plate (not shown) is disposed in between the printed wiring board 34 and the battery module 200.

The other terminal 22a of the positive electrode lead 22 is electrically connected to a positive electrode connector 342. The other terminal 23a of the negative electrode lead 23 is electrically connected to a negative electrode connector 343.

The thermistor 345 is fixed to one principal surface of the printed wiring board 34. The thermistor 345 detects the temperature of each unit cell 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive side terminal 352 and a negative side terminal 353.

The protective circuit 346 is fixed to the other principal surface of the printed wiring board 34. The protective circuit 346 is connected to the positive side terminal 352 via the plus-side wire 348a. The protective circuit 346 is connected to the negative side terminal 353 via the minus-side wire 348b. In addition, the protective circuit 346 is electrically connected to the positive electrode connector 342 via the wiring 342a. The protective circuit 346 is electrically connected to the negative electrode connector 343 via the wiring 343a. Furthermore, the protective circuit 346 is electrically connected to each unit cell 100 in the plurality of unit cells 100 via the wires 35.

The protective sheets 33 are arranged on both inner surfaces of the housing container 31 along the long side direction and on one inner surface of the housing container 31 along the short side direction facing the printed wiring board 34 through the battery module 200. The protective sheet 33 is made of, for example, resin or rubber.

The protective circuit 346 controls charging and discharging of the plurality of unit cells 100. The protective circuit 346 is also configured to cut off electric connection between the protective circuit 346 and the external power distribution terminal 350 (the positive side terminal 352 and the negative side terminal 353) to the external devices, based on detection signals transmitted from the thermistor 345 or detection signals transmitted from each unit cell 100 or the battery module 200.

An example of the detection signal transmitted from the thermistor 345 is a signal indicating that the temperature of the unit cell(s) 100 is detected to be a predetermined temperature or more. An example of the detection signal transmitted from each unit cell 100 or the battery module 200 is a signal indicating detection of over-charge, over-discharge, and overcurrent of the unit cell(s) 100. When detecting over-charge or the like for each of the unit cells 100, the battery voltage may be detected, or a positive electrode potential or negative electrode potential may be detected. In the latter case, a lithium electrode to be used as a reference electrode may be inserted into each unit cell 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include a plurality of battery modules 200. In this case, the plurality of battery modules 200 may be connected in series, in parallel, or connected in a combination of in-series connection and in-parallel connection. The printed wiring board 34 and the wires 35 may be omitted. In this case, the positive electrode lead 22 and the negative electrode lead 23 may be used as the positive side terminal and the negative side terminal of the external power distribution terminal, respectively.

Such a battery pack is used for, for example, an application required to have the excellent cycle performance when a large current is taken out. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the fourth embodiment includes the secondary battery according to the second embodiment or the battery module according to the third embodiment. Therefore, according to the fourth embodiment, there can be provided the battery pack including the second battery or battery module, which can achieve excellent cycle life characteristics.

Fifth Embodiment

According to the fifth embodiment, a vehicle is provided. The vehicle includes the battery pack according to the fourth embodiment.

In a vehicle according to the fifth embodiment, the battery pack is configured, for example, to recover regenerative energy from motive force of the vehicle. The vehicle may include a mechanism configured to convert kinetic energy of the vehicle into regenerative energy.

Examples of the vehicle according to the fifth embodiment include two- to four-wheeled hybrid electric automobiles, two- to four-wheeled electric automobiles, electric assist bicycles, and railway cars.

In the vehicle according to the fifth embodiment, the installing position of the battery pack is not particularly limited. For example, the battery pack may be installed in the engine compartment of the vehicle, in rear parts of the vehicle, or under seats.

A plurality of battery packs is loaded on the vehicle according to the fifth embodiment. In this case, the batteries included in each of the battery packs may be electrically connected to each other in series, in parallel, or in a combination of in-series connection and in-parallel connection. For example, in the case where each battery pack includes a battery module, the battery modules may be electrically connected to each other in series, in parallel, or in a combination of in-series connection and in-parallel connection. Alternatively, in the case where each battery pack includes a single battery, each of the batteries may be electrically connected to each other in series, in parallel, or in a combination of in-series connection and in-parallel connection.

Next, one example of the vehicle according to the fifth embodiment will be described with reference to the drawings.

Figure 14:
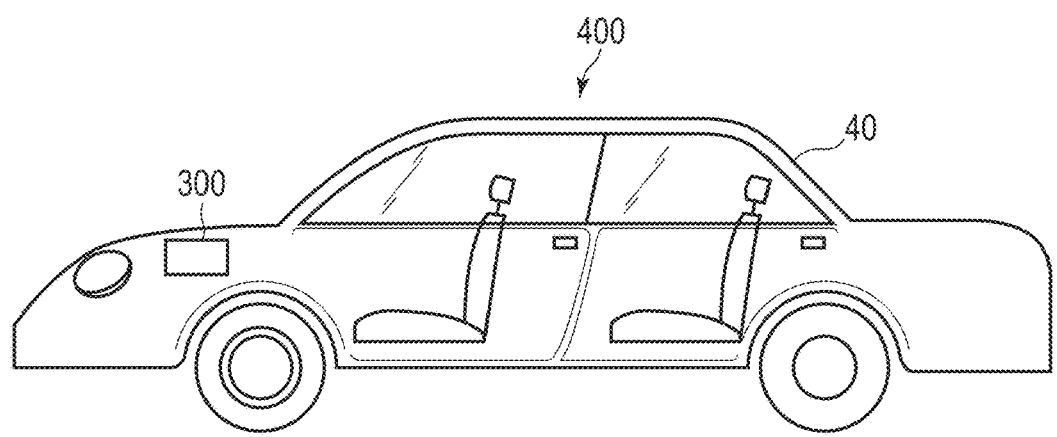
FIG. 14 is a partially transparent view schematically illustrating an example of a vehicle according to an embodiment.

FIG. 14 is a partially transparent diagram schematically illustrating one example of a vehicle according to the embodiment.

A vehicle 400 illustrated in FIG. 14 includes a vehicle body 40 and a battery pack 300 according to the embodiment. In the example illustrated in FIG. 14, the vehicle 400 is a four-wheeled automobile.

A plurality of the battery packs 300 may be loaded on the vehicle 400. In this case, the batteries included in the battery packs 300 (for example, unit cell or battery modules) may be connected in series, connected in parallel, or connected in a combination of in-series connection and in-parallel connection.

In FIG. 14, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

Next, an embodiment of the vehicle according to the fifth embodiment will be described with reference to FIG. 15.

Figure 15:
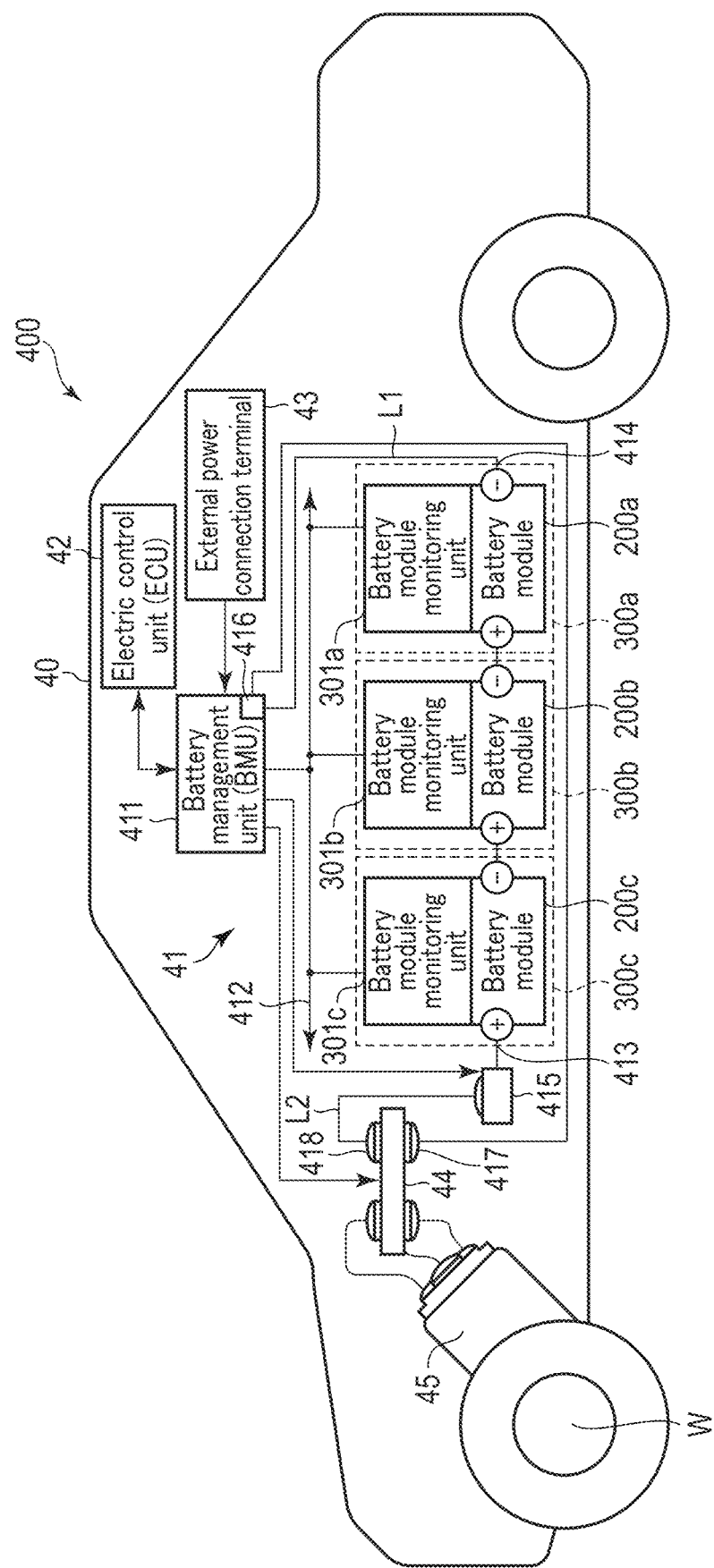
FIG. 15 is a view schematically illustrating an example of a control system relating to an electrical system in the vehicle according to the embodiment.

FIG. 15 is a diagram schematically illustrating one example of a control system related to an electrical system in the vehicle according to the fifth embodiment. The vehicle 400 illustrated in FIG. 15 is an electric automobile.

The vehicle 400, shown in FIG. 15, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 15, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

A battery pack 300a is provided with a battery module 200a and a battery module monitoring apparatus 301a (for example, voltage temperature monitoring (VTM)). A battery pack 300b is provided with a battery module 200b and a battery module monitoring apparatus 301b. A battery pack 300c is provided with a battery module 200c and a battery module monitoring apparatus 301c. The battery packs 300a to 300c are battery packs similar to the battery pack 300 described earlier, and the battery modules 200a to 200c are battery modules similar to the battery module 200 described earlier. The battery modules 200a to 200c are electrically connected in series. The battery packs 300a, 300b, and 300c are removable independently of each other, and each can be replaced with a different battery pack 300.

Each of the battery modules 200a to 200c includes plural battery cells connected in series. At least one of the plural battery cells is the secondary battery according to the second embodiment. The battery modules 200a to 200c each perform charging and discharging via a positive electrode terminal 413 and a negative electrode terminal 414.

A battery management apparatus 411 communicates with the battery module monitoring apparatus 301a to 301c, and collects information related to the voltage, temperature, and the like for each of the unit cells 100 included in the battery modules 200a to 200c included in the vehicle power source 41. With this arrangement, the battery management apparatus 411 collects information related to the maintenance of the vehicle power source 41.

The battery management apparatus 411 and the battery module monitoring apparatus 301a to 301c are connected via a communication bus 412. In the communication bus 412, a set of communication wires are shared with a plurality of nodes (the battery management apparatus 411 and one or more of the battery module monitoring apparatus 301a to 301c). The communication bus 412 is a communication bus, for example, configured in accordance with the controller area network (CAN) standard.

The battery module monitoring units 301a to 301c measure a voltage and a temperature of each battery cell in the battery modules 200a to 200c based on commands from the battery management unit 411. It is possible, however, to measure the temperatures only at several points per battery module, and the temperatures of all of the battery cells need not be measured.

The vehicle power source 41 can also have an electromagnetic contactor (for example, a switch apparatus 415 illustrated in FIG. 15) that switches the presence or absence of an electrical connection between a positive electrode terminal 413 and a negative electrode terminal 414. The switch apparatus 415 includes a pre-charge switch (not illustrated) that turns on when the battery modules 200a to 200c are charged, and a main switch (not illustrated) that turns on when the output from the battery modules 200a to 200c is supplied to the load. Each of the pre-charge switch and the main switch is provided with a relay circuit (not illustrated) that switches on or off according to a signal supplied to a coil disposed near a switching element. The electromagnetic contactor such as the switch apparatus 415 is controlled according to of control signals from the battery management apparatus 411 or the vehicle ECU 42 that controls the entire operation of the vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management apparatus 411, or the vehicle ECU 42 which controls the entire operation of the vehicle. By controlling the inverter 44, the output voltage from the inverter 44 is adjusted.

The drive motor 45 is rotated by electric power supplied from the inverter 44. The driving force produced by the rotation of the drive motor 45 is transmitted to an axle (or axles) and drive wheels W via a differential gear unit for example.

The vehicle 400 also includes a regenerative brake mechanism (regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connection line L1 is connected to the negative electrode terminal 414 of the vehicle power source 41. The other terminal of the connection line L1 is connected to a negative electrode input terminal 417 of the inverter 44. On the connection line L1, a current detector (current detection circuit) 416 is provided inside the battery management apparatus 411 between the negative electrode terminal 414 and the negative electrode input terminal 417.

One terminal of a connection line L2 is connected to the positive electrode terminal 413 of the vehicle power source 41. The other terminal of the connection line L2 is connected to a positive electrode input terminal 418 of the inverter 44. On the connection line L2, the switch apparatus 415 is provided between the positive electrode terminal 413 and the positive electrode input terminal 418.

The external terminal 43 is connected to the battery management apparatus 411. The external terminal 43 can be connected to, for example, an external power source.

The vehicle ECU 42 cooperatively controls the vehicle power source 41, the switch apparatus 415, the inverter 44, and the like together with other management apparatus and control apparatus, including the battery management apparatus 411, in response to operation input from a driver or the like. By the cooperative control by the vehicle ECU 42 and the like, the output of electric power from the vehicle power source 41, the charging of the vehicle power source 41, and the like are controlled, and the vehicle 400 is managed as a whole. Data related to the maintenance of the vehicle power source 41, such as the remaining capacity of the vehicle power source 41, is transferred between the battery management apparatus 411 and the vehicle ECU 42 by a communication line.

The vehicle according to the fifth embodiment includes the battery pack according to the fourth embodiment. Therefore, according to the fifth embodiment, there can be provided the vehicle including the battery pack which can achieve excellent cycle life characteristics.

EXAMPLES

Examples will be described below. The embodiments are not limited to the Examples described below.

Example 1

<Fabrication of Negative Electrode>

Monoclinic $Nb_2TiO_7$ powder was obtained by solid-phase synthesis, as described below. Commercially available oxide reagents, $Nb_2O_5$ and $TiO_2$, were used as starting raw materials. Powders of these materials were added in a mortar at a molar ratio of 1:1, and mixed for 30 minutes. Thereafter, the mixed powder was put in an electric furnace, and was fired at 1600° C. for 20 hours, and thus $Nb_2TiO_7$ powder was obtained. In addition, acetylene black was prepared as a conductive agent, and polyvinylidene fluoride (PVdF) was prepared as a binder. Next, 100 parts by mass of a negative electrode active material, 5 parts by mass of a conductive agent and 5 parts by mass of a binder were added to N-methylpyrrolidone (NMP) and mixed, and thus a negative electrode slurry was prepared. The negative electrode slurry was applied to both surfaces of the current collector which is formed of an aluminum foil with a thickness of 15 μm. Then, the coating films were dried for 12 hours in a constant temperature bath at 120° C., and a multilayer body was obtained. The multilayer body was subjected to roll press, and a negative electrode was obtained. The density (electrode density) of the active material-containing layer, which one surface of the obtained negative electrode includes, was 2.7 g/cm³.

<Fabrication of Positive Electrode>

100 mass % of a $LiNi_{0.5}Co_{0.2}Mn_{0.3}O_2$ composite oxide (NCM523) as a positive electrode active material, in which an average particle size of primary particles is 2 μm, 5 mass % of graphite powder as a conductive agent, and 5 mass % of PVDF as a binder were mixed, and dispersed in a N-methylpyrrolidone (NMP) solvent, and a slurry was prepared. The above mixing amounts are masses relative to the mass of the positive electrode active material-containing layer. Then, the slurry was applied to both surfaces of an aluminum alloy foil (purity: 99%) with a thickness of 15 μm, and was dried, and thus a multilayer body was obtained. The multilayer body was subjected to roll press, and a positive electrode was obtained. The density (electrode density) of the active material-containing layer, which one surface of the obtained positive electrode includes, was 3.2 g/cm³.

<Preparation of Nonaqueous Electrolyte>

Propylene carbonate and diethyl carbonate were mixed at a volume ratio of 1:2, and a mixed solvent was prepared. $LiPF_6$ was dissolved in this mixed solvent at a concentration of 1 M, and a liquid-state nonaqueous electrolyte was prepared.

<Manufacture of Secondary Battery>

The positive electrode obtained as described above, a polyethylene separator with a thickness of 20 μm, and the negative electrode obtained as described above, are alternately stacked, and an electrode group was fabricated. Terminals formed of aluminum were ultrasonic-welded to the positive electrode current collector and negative electrode current collector which the obtained electrode group includes. Thereafter, the electrode group was stored in a pack made of a laminate film, and dried in a vacuum at 80° C. for 24 hours. Note that the laminate film is a film in which polypropylene layers are formed on both surfaces of an aluminum foil with a thickness of 40 μm. The total thickness of the laminate film is 0.1 mm. Further, the liquid-state nonaqueous electrolyte was poured in the pack made of the laminate film, and the pack was completely sealed by heat seal, and thus the secondary battery was manufactured.

Example 2

A secondary battery was manufactured by the same method as in Example 1, except that when the negative electrode was fabricated, the firing temperature at the time of solid-phase synthesis was changed to 1500° C., the load for roll press was decreased, and the electrode density was set at 2.5 g/cm³.

Example 3

A secondary battery was manufactured by the same method as in Example 2, except that when the negative electrode was fabricated, the load for roll press was increased, and the electrode density was set at 2.7 g/cm³.

Example 4

A secondary battery was manufactured by the same method as in Example 2, except that when the negative electrode was fabricated, the load for roll press was increased, and the electrode density was set at 2.9 g/cm³.

Example 5

A secondary battery was manufactured by the same method as in Example 3, except that when the negative electrode was fabricated, acetylene black with a bulk density of 0.05 g/cm³ was used as the conductive agent.

Example 6

A secondary battery was manufactured by the same method as in Example 3, except that when the negative electrode was fabricated, acetylene black with a bulk density of 0.15 g/cm³ was used as the conductive agent.

Comparative Example 1

A secondary battery was manufactured by the same method as in Example 2, except that when the negative electrode was fabricated, the load for roll press was decreased, and the electrode density was set at 2.0 g/cm³.

Comparative Example 2

A secondary battery was manufactured by the same method as in Example 1, except that the negative electrode was fabricated as follows.

At the time of solid-phase synthesis, KCl was added as a flux at a ratio of 0.2 wt % to the raw material mixture powder including $Nb_2O_5$ and $TiO_2$, and the resultant was mixed in a mortar for 30 minutes. Thereafter, the obtained mixed powder was put in an electric furnace, and was fired at 1600° C. for 20 hours, and thus $Nb_2TiO_7$ powder was obtained. Compared to the case in which KCl was not added, the thus obtained $Nb_2TiO_7$ powder included many flat particles. In addition, the obtained $Nb_2TiO_7$ powder was washed by pure water.

Comparative Example 3

A secondary battery was manufactured by the same method as in Example 1, except that when the negative electrode was fabricated, the firing temperature at the time of solid-phase synthesis was changed to 1400° C.

Comparative Example 4

A secondary battery was manufactured by the same method as in Example 1, except that when the negative electrode was fabricated, the firing temperature at the time of solid-phase synthesis was changed to 1900° C.

<Charge-and-Discharge Rate Tests>

Charge-and-discharge rate tests were conducted on the secondary batteries manufactured in the Examples and Comparative Examples.

As regards each of the obtained secondary batteries, charge and discharge were conducted in a voltage range of 1.5 V to 2.7 V in a 25° C. environment, with a current value corresponding to 0.2 C at a time when the 1-hour rate of the cell design capacity was defined as 1 C. Thus, the initial discharge capacity of the secondary battery was measured. Thereafter, in the 25° C. environment, the secondary battery was charged with a current value corresponding to 0.2 C, until the SOC (State of Charge) reaches 100%. Subsequently, discharge tests were conducted at a 1 C rate and a 4 C rate until the voltage of the secondary battery reached 1.5 V, and the discharge capacity was measured. Further, the discharge capacity ratio was calculated by dividing the discharge capacity at the 4 C rate by the discharge capacity at the 1 C rate. The result is shown in Table 1. Note that the discharge capacity ratio serves an index for evaluating input/output characteristics.

<X-Ray Diffractometry of Negative Electrode>

As regards each of the secondary batteries manufactured in the Examples and Comparative Examples, X-ray diffractometry was performed with respect to the surface of the active material-containing layer according to the method described in the first embodiment. In addition, the peak intensity ratio (Ia/Ib) was calculated from the diffraction pattern obtained with respect to the negative electrode which each secondary battery includes. The result is shown in Table 1.

FIG. 18 shows results of X-ray diffraction relating to Example 1, Example 3, Comparative Example 1 and Comparative Example 2. In the diffraction diagram shown in FIG. 18, the abscissa axis indicates a diffraction angle (2θ), and the ordinate axis indicates relative intensity. As shown in FIG. 18, in diffraction charts relating to Example 1, Example 3, Comparative Example 1 and Comparative Example 2, a peak A with a highest intensity was detected in a range of 2θ=26°±0.2°. In addition, in the diffraction charts relating to Example 1, Example 3, Comparative Example 1 and Comparative Example 2, a peak B with a highest intensity was detected in a range of 2θ=23.9°±0.2°.

<SEM Observation of Negative Electrode Cross Section, and Calculation of Ratio of Bounding Rectangle>

As regards each of the secondary batteries manufactured in the Examples and Comparative Examples, SEM observation was conducted according to the method described in the first embodiment, and the ratio of the bounding rectangle was calculated. The result is shown in Table 1.

Figure 16:
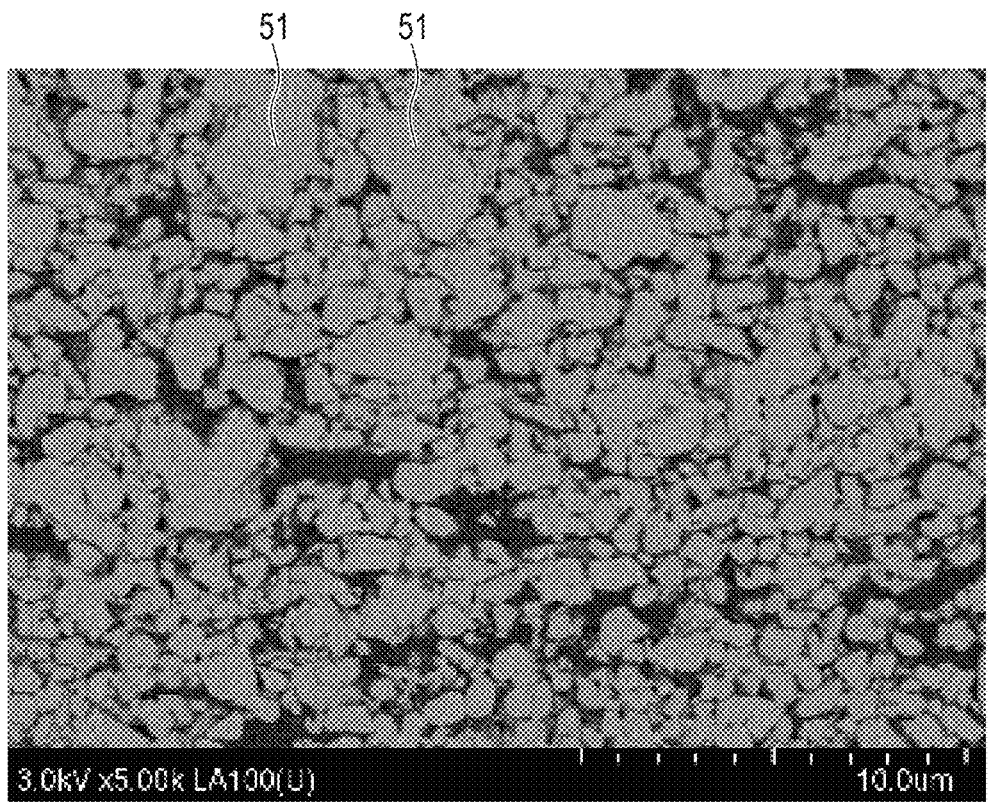
FIG. 16 is an SEM image showing a cross section of the active material-containing layer according to the embodiment.

FIG. 16 shows an SEM image relating to a cross section of the active material-containing layer. As described above, the SEM image is an image observed at the magnification of 5000. In the SEM image shown in FIG. 16, a part indicated in gray is at least one niobium titanium composite oxide particle 51. The at least one niobium titanium composite oxide particle 51 may be a primary particle or a secondary particle. In the SEM image, a part indicated in black may be an electrode material other than the at least one niobium titanium composite oxide particle 51, or a gap. For example, the part indicated in black may be a conductive agent, a binder or a gap.

Figure 17:
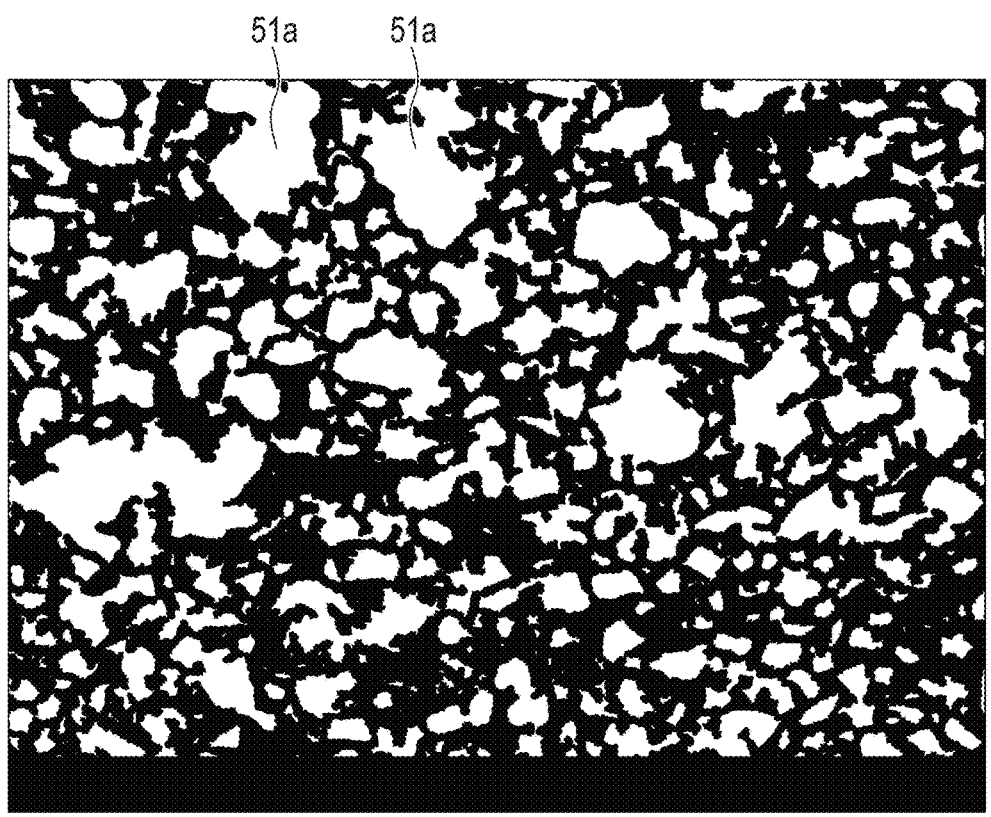
FIG. 17 is an image obtained by binarizing the SEM image shown in FIG. 16.

FIG. 17 shows an image obtained by binarizing the SEM image of FIG. 16 according to a predetermined algorithm. Most of gray parts shown in FIG. 16 are converted to white, and most of black parts shown in FIG. 16 are converted to black. For example, the at least one niobium titanium composite oxide particle 51 shown in FIG. 16 is converted to white, as indicated by a reference sign 51a in FIG. 17. The ratio of the bounding rectangle is calculated from the image binarized as shown in FIG. 17, according to the conditions described in the first embodiment.

<Tap Density Measurement of Niobium Titanium Composite Oxide Particles>

With respect to each of the secondary batteries manufactured in the Examples and Comparative Examples, the tap density of niobium titanium composite oxide particles included in the negative electrode was measured according to the method described in the first embodiment. The result is shown in Table 1.

<Aspect Ratio Measurement of Niobium Titanium Composite Oxide Particles>

With respect to each of the secondary batteries manufactured in the Examples and Comparative Examples, the aspect ratios of niobium titanium composite oxide particles included in the negative electrode were measured according to the method described in the first embodiment. The result is shown in Table 1.

<Bulk Density Measurement of Conductive Agent>

With respect to each of the secondary batteries manufactured in the Examples and Comparative Examples, the bulk density of the conductive agent included in the negative electrode was measured according to the method described in the first embodiment. The result is shown in Table 1.

<Average Particle Size Measurement of Niobium Titanium Composite Oxide Particles>

With respect to each of the secondary batteries manufactured in the Examples and Comparative Examples, the average particle size d50 of niobium titanium composite oxide particles included in the negative electrode active material-containing layer was measured by a method described below. The result is shown in Table 1.

To begin with, like the tap density measurement, niobium titanium composite oxide powder was taken out from the negative electrode active material-containing layer. Thereafter, using Microtrac MT3300EXII manufactured by Nikkiso Co., Ltd. as a particle size distribution measuring apparatus, the average particle size d50 of the niobium titanium composite oxide powder was measured. Concretely, ultrasonic waves are radiated on the powder for 60 seconds with an output of 30 W, and then measurement was conducted in a reflection mode.

In Table 1 below, the column of "Firing temperature" indicates a firing temperature at a time of solid-phase synthesizing a niobium titanium composite oxide. The column of "Tap density" indicates a tap density of niobium titanium composite oxide powder included in the negative electrode. The column of "Aspect ratio" indicates an aspect ratio (average value) of primary particles of the niobium titanium composite oxide included in the negative electrode. The column of "Average particle size d50" indicates an average particle size d50 of the niobium titanium composite oxide powder included in the negative electrode. The column of "Bulk density" indicates a bulk density of a conductive agent included in the negative electrode. The column of "Electrode density" indicates a density of the negative electrode active material-containing layer (only one surface). The column of "Peak intensity ratio (Ia/Ib)" indicates a peak intensity ratio (Ia/Ib) in the diffraction diagram obtained by X-ray diffraction with respect to the surface of the negative electrode active material-containing layer. The column of "Ratio of bounding rectangle (W/H)" indicates a ratio of a bounding rectangle obtained based on a cross-sectional SEM image of the negative electrode active material-containing layer. The column of "Discharge capacity ratio" indicates a discharge capacity ratio calculated from the above-described charge-and-discharge rate test.

TABLE 1

| | Niobium titanium composite oxide particles | | | | Bulk density of conductive agent (g/cm³) | Electrode density (g/cm³) | Peak intensity ratio (Ia/Ib) | Ratio of bounding rectangle (W/H) | Discharge capacity ratio |
| | Firing temperature (° C.) | Tap density (g/cm³) | Aspect ratio | Average particle size d50 (μm) | | | | | |
|---|---|---|---|---|---|---|---|---|---|
| Example 1 | 1600 | 1.8 | 1.96 | 3.2 | 0.08 | 2.7 | 2.01 | 0.85 | 0.78 |
| Example 2 | 1500 | 1.5 | 1.95 | 2.3 | 0.08 | 2.5 | 1.97 | 0.84 | 0.71 |
| Example 3 | 1500 | 1.5 | 2.01 | 2.3 | 0.08 | 2.7 | 2.17 | 1.0 | 0.70 |
| Example 4 | 1500 | 1.5 | 2.07 | 2.3 | 0.08 | 2.9 | 2.55 | 1.2 | 0.70 |
| Example 5 | 1500 | 1.5 | 2.01 | 2.3 | 0.05 | 2.7 | 2.23 | 1.1 | 0.69 |
| Example 6 | 1500 | 1.5 | 2.01 | 2.3 | 0.15 | 2.7 | 2.08 | 1.0 | 0.72 |
| Comparative Example 1 | 1500 | 1.5 | 1.72 | 2.3 | 0.08 | 2.0 | 1.66 | 0.62 | 0.52 |
| Comparative Example 2 | 1600 | 1.3 | 4.10 | 2.9 | 0.08 | 2.7 | 8.25 | 1.6 | 0.45 |
| Comparative Example 3 | 1400 | 1.3 | 1.78 | 1.8 | 0.08 | 2.7 | 2.77 | 1.3 | 0.64 |
| Comparative Example 4 | 1900 | 2.0 | 2.10 | 5.1 | 0.08 | 2.7 | 1.75 | 0.75 | 0.58 |

From Table 1, the following is understood.

Among the Examples and Comparative Examples, the Examples, in which the peak intensity ratio (Ia/Ib) is in the range of 1.80 or more to 2.60 or less in the diffraction diagram of X-ray diffraction with respect to the surface of the negative electrode active material-containing layer, successfully achieved excellent output characteristics. According to the negative electrodes of the Examples, the same advantageous effects can also be expected at the time of input.

Compared to Example 3, the discharge capacity ratio in Example 1 is excellent. One reason for this is that the average particle size D50 of niobium titanium composite oxide particles of Example 1 was greater than that of Example 3. When the average particle size of niobium titanium composite oxide particles is small, the specific surface area increases, and thus there is a tendency that the amount of the conductive agent, which is necessary for securing the conductive path in the active material-containing layer, increases. However, in Examples 1 and 3, the amounts of the conductive agents included in the active material-containing layers are equal. There is a possibility that since the average particle size D50 is smaller in Example 3, the amount of the conductive agent became relatively deficient and the electrical resistance slightly increased.

Although the electrode density is identical between Example 1 and Example 3, the discharge capacity ratio was more excellent in Example 1. The reason for this is considered to be that the peak intensity ratio and the ratio of the bounding rectangle are lower in Example 1 due to the difference in tap density of niobium titanium composite oxide particles between Example 1 and Example 3. In this case, it can be said that the niobium titanium composite oxide particles in the negative electrode active material-containing layer are not excessively oriented.

From the comparison between Example 2 and Comparative Example 1, it is understood that, for example, even if the niobium titanium composite oxide particles are synthesized at the identical firing temperature, if the electrode density is low, the peak intensity ratio tends to decrease. The output characteristics of Example 2 were conspicuously excellent, compared to the output characteristics of Comparative Example 1.

Examples 3, 5 and 6 are examples in which the electrode density is equal (2.7 g/cm³). As shown in these Examples, it is understood that even if the bulk density of the conductive agent varies, if the peak intensity ratio (Ia/Ib) is in the range of 1.80 or more to 2.60 or less, excellent output characteristics can be achieved.

Although the electrode density in each of Comparative Examples 2 and 3 is equal to the electrode density in each of Examples 1 and 3, the peak intensity ratio (Ia/Ib) in each of Comparative Examples 2 and 3 falls out of the range of 1.80 or more to 2.60 or less. A main reason for this is considered to be that the tap densities of niobium titanium composite oxide particles according to Comparative Examples 2 and 3 were low. As a result, the output characteristics of each of Comparative Examples 2 and 3 are inferior to the output characteristics of each of Examples 1 and 3.

According to at least one of the above-described embodiments and Examples, an electrode is provided. The electrode includes a current collector, and an active material-containing layer which is formed on a surface of the current collector and includes a plurality of niobium titanium composite oxide particles. A X-ray diffraction pattern using a Cu-Kα ray source with respect to a surface of the active material-containing layer includes a peak A with a highest intensity in a range of 2θ=26°±0.2° and a peak B with a highest intensity in a range of 2θ=23.9°±0.2°. An intensity ratio (Ia/Ib) between an intensity Ia of the peak A and an intensity Ib of the peak B is in a range of 1.80 or more to 2.60 or less. In the electrode according to the embodiment, an excessive increase of orientation of niobium titanium composite oxide particles in the active material-containing layer is suppressed, and thus lithium ions tend to easily diffuse in the thickness direction of the electrode. Therefore, the electrode according to the embodiment can achieve excellent input/output characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of

What is claimed is:

1. An electrode comprising:
a current collector; and
an active material-containing layer which is formed on a surface of the current collector and comprises a plurality of niobium titanium composite oxide particles,
wherein a X-ray diffraction pattern using a Cu-Kα ray source with respect to a surface of the active material-containing layer comprises a peak A with a highest intensity in a range of 2θ=26°±0.2° and a peak B with a highest intensity in a range of 2θ=23.9°±0.2°,
wherein an intensity ratio (Ia/Ib) between an intensity Ia of the peak A and an intensity Ib of the peak B is in a range of 1.80 or more to 2.60 or less, and wherein the plurality of the niobium titanium composite oxide particles have a major axis oriented towards an in-plane direction of the current collector.

2. The electrode according to claim 1, wherein
when a cross section of the active material-containing layer along a stacking direction of the current collector and the active material-containing layer is observed by a scanning electron microscope, an average value of ratios (W/H) of bounding rectangles with respect to 200 niobium titanium composite oxide particles is in a range of 0.80 to 1.5,
the 200 niobium titanium composite oxide particles are selected at random from among niobium titanium composite oxide particles each having an area of 0.1 μm² to 5 μm² the cross section, and
with respect to each of the 200 niobium titanium composite oxide particles, the ratio (W/H) of the bounding rectangle of the niobium titanium composite oxide particle is determined, the bounding rectangle being defined by a maximum height (H) of the niobium titanium composite oxide particle along the stacking direction and a maximum width (W) of the niobium titanium composite oxide particle along an in-plane direction orthogonal to the stacking direction.

3. The electrode according to claim 1, wherein a tap density of the plurality of the niobium titanium composite oxide particles is in a range of 1.0 g/cm³ to 1.9 g/cm³.

4. The electrode according to claim 1, wherein an electrode density is in a range of 2.2 g/cm³ to 3.0 g/cm³.

5. The electrode according to claim 1, wherein the active material-containing layer comprises a carbon material, and
a bulk density of the carbon material is in a range of 0.08 g/cm³ to 0.15 g/cm³.

6. The electrode according to claim 1, wherein
the niobium titanium composite oxide is a monoclinic niobium titanium composite oxide,
the monoclinic niobium titanium composite oxide is at least one selected from the group consisting of a composite oxide expressed by a general formula, $Li_xTi_{1-y}M1_yNb_{2-z}M2_zO_{7\pm\delta}$, and a composite oxide expressed by a general formula, $Li_xTi_{1-y}M3_{y+z}Nb_{2-z}O_{7-\delta}$,
the M1 is at least one selected from the group consisting of Zr, Si, and Sn, the M2 is at least one selected from the group consisting of V, Ta, and Bi, and the M3 is at least one selected from the group consisting of Mg, Fe, Ni, Co, W, Ta, and Mo, and
the x satisfies $0 \leq x \leq 5$, the y satisfies $0 \leq y < 1$, the z satisfies $0 \leq z < 2$, and the δ satisfies $-0.3 \leq \delta \leq 0.3$.

7. A secondary battery comprising:
a positive electrode;
a negative electrode; and
an electrolyte,
the negative electrode being the electrode according to claim 1.

8. A battery pack comprising the secondary battery according to claim 7.

9. The battery pack according to claim 8, further comprising:
an external power distribution terminal; and
a protective circuit.

10. The battery pack according to claim 8, wherein
the battery pack comprises a plurality of the secondary battery, and
the secondary batteries are electrically connected in series, or in parallel, or in series and in parallel in a combined manner.

11. A vehicle comprising the battery pack according to claim 8.

12. The vehicle according to claim 11, further comprising a mechanism configured to convert kinetic energy of the vehicle to regenerative energy.

13. The electrode according to claim 1, wherein the plurality of niobium titanium composite oxide particles has flat shapes.

14. The electrode according to claim 1, wherein an electrode density is in a range of 2.2 g/cm$^3$ to 2.9 g/cm$^3$.

15. The electrode according to claim 1, wherein the plurality of niobium titanium composite oxide particles comprise primary particles which contain niobium titanium composite oxide,
wherein an aspect ratio of the primary particles is in a range of 1 or more to less than 4, and
wherein the aspect ratio is represented by L/S where L is an arithmetic mean value of lengths of major axes of the primary particles and S is an arithmetic mean value of lengths of minor axes of the primary particles, each of the minor axes being direction of the niobium titanium composite oxide, each of the major axes being direction of the niobium titanium composite oxide and/or direction of the niobium titanium composite oxide.

16. The electrode according to claim 15, wherein the aspect ratio of the primary particles is in a range of 1.95 or more to 3 or less.

17. The electrode according to claim 15, wherein the aspect ratio of the primary particles is in a range of 1.95 or more to 2.07 or less.

18. The electrode according to claim 1, wherein the intensity ratio (Ia/Ib) is in a range of from 1.80 to 2.2.

19. The electrode according to claim 1, wherein the intensity ratio (Ia/Ib) is in a range of from 1.91 to 2.55.

20. The electrode according to claim 1, wherein the intensity ratio (Ia/Ib) is in a range of from 1.91 to 2.23.

* * * * *